United States Patent
Narayan

(10) Patent No.: US 12,491,955 B2
(45) Date of Patent: Dec. 9, 2025

(54) TRACK GUIDE ASSEMBLY

(71) Applicant: Metal Testing Pty Ltd, Brisbane (AU)

(72) Inventor: Mohan Raju Narayan, Brisbane (AU)

(73) Assignee: Metal Testing Pty Ltd, Brisbane (AU)

( * ) Notice: Subject to any disclaimer, the term of this patent is extended or adjusted under 35 U.S.C. 154(b) by 379 days.

(21) Appl. No.: 18/024,784

(22) PCT Filed: Sep. 18, 2020

(86) PCT No.: PCT/AU2020/050991
§ 371 (c)(1),
(2) Date: Mar. 6, 2023

(87) PCT Pub. No.: WO2022/047518
PCT Pub. Date: Mar. 10, 2022

(65) Prior Publication Data
US 2023/0322313 A1    Oct. 12, 2023

(30) Foreign Application Priority Data
Sep. 7, 2020 (AU) ................................ 2020903190

(51) Int. Cl.
*B62D 55/15* (2006.01)
*B62D 55/32* (2006.01)

(52) U.S. Cl.
CPC ............ *B62D 55/15* (2013.01); *B62D 55/32* (2013.01)

(58) Field of Classification Search
CPC .... B62D 55/15; B62D 55/0847; B62D 55/32; B62D 55/305; B62D 55/14; B62D 55/08
See application file for complete search history.

(56) References Cited

U.S. PATENT DOCUMENTS

| | | | | |
|---|---|---|---|---|
| 2,017,729 A * | 10/1935 | Panzegrau | ........... | B62D 55/305 474/135 |
| 2,809,077 A * | 10/1957 | Christensen | ........... | B62D 55/15 384/428 |
| 5,409,305 A * | 4/1995 | Nagorcka | ............ | B62D 55/15 305/153 |
| 5,639,148 A * | 6/1997 | Sheidler | ............... | B62D 55/084 305/138 |
| 10,246,150 B2 | 4/2019 | Pizon | | |
| 2008/0011524 A1* | 1/2008 | Despres | ............... | B62D 55/125 180/9.21 |
| 2010/0253138 A1* | 10/2010 | Despres | ................ | B62D 55/04 305/130 |
| 2013/0154346 A1 | 6/2013 | Beasley et al. | | |
| 2014/0284996 A1 | 9/2014 | Necib | | |

FOREIGN PATENT DOCUMENTS

| | | |
|---|---|---|
| CN | 204021037 U | 12/2014 |
| CN | 208306787 U | 1/2019 |
| CN | 210502946 U | 5/2020 |
| KR | 200442650 Y1 | 12/2008 |

* cited by examiner

*Primary Examiner* — Kip T Kotter
(74) *Attorney, Agent, or Firm* — The Webb Law Firm

(57) ABSTRACT

A track guide assembly for a tracked vehicle, the track guide assembly having a base member adapted to support a track roller, and a shaft member releasably attached or attachable to the base member, the shaft member including a flange portion.

20 Claims, 28 Drawing Sheets

TRACK GUIDE ASSEMBLY

CROSS REFERENCE TO RELATED APPLICATIONS

This application is the United States national phase of International Patent Application No. PCT/AU2020/050991 filed Sep. 18, 2020, and claims priority to Australian Patent Application No. 2020903190 filed Sep. 7, 2020, the disclosures of which are hereby incorporated by reference in their entireties.

BACKGROUND OF THE INVENTION

Field of the Invention

The present invention relates to a track guide assembly. The present invention has particular but not exclusive application for track driven machinery. The patent specification describes this use but it is by way of example only and the invention is not limited to this use.

Background of the Invention

Track assemblies are typically used to move heavy vehicles such as earth moving vehicles and mining vehicles. Track assemblies enable heavy vehicles to traverse soft ground with less likelihood of becoming stuck due to sinking as the weight of the vehicle is distributed over a larger contact area.

Track assemblies typically include a number of wheels, one or more of which can be driving wheels. Alternatively track assemblies can include one or more sprockets to drive the track. Track assemblies also typically include an idler wheel or roller wheel on each track to guide and tension the track and inhibit the track from jamming or coming off the wheels or sprockets.

One problem with idler wheels or roller wheels is that the stresses on the idler wheels or roller wheels can cause the idler wheel or roller wheel supports to break. Replacing a broken support can be difficult and time consuming.

Supports can sometimes be repaired by welding the broken support, however, this typically requires the support to be removed, welded and replaced. Additionally, a welded support can sometimes be more susceptible to subsequent breaks at or near the weld.

OBJECT OF THE INVENTION

It is an object of the present invention to overcome or at least alleviate one or more of the above mentioned problems with track driven machinery and/or provide the consumer with a useful or commercial choice.

SUMMARY OF THE INVENTION

In one aspect, the present invention broadly resides in a track guide assembly having
 a base member adapted to support a track roller; and
 a shaft member releasably attached or attachable to the base member, the shaft member including a flange portion.
Preferably, the flange portion is adapted to be attached to the base member. Preferably, the flange portion is adapted to be attached to the base member by a plurality of fasteners.
Preferably the track guide assembly is for a tracked vehicle.

In another aspect, the present invention broadly resides in a track guide assembly having
 a base member adapted to support a track roller; and
 a shaft member releasably attached or attachable to the base member, the shaft member including a flange portion,
 wherein the flange portion is adapted to be attached to the base member by a plurality of fasteners.

Preferably the flange portion includes a plurality of rib portions. Preferably the plurality of rib portions are spaced from each other. Preferably the flange portion includes a plurality of shoulder portions. Preferably each of the plurality of rib portions are spaced from an adjacent rib member by one of the plurality of shoulder portions. Preferably each of the plurality of rib portions has a greater thickness than each of the plurality of shoulder portions. In another embodiment, an open space is defined between adjacent rib portions. Preferably the flange portion includes between four and ten rib portions. More preferably the flange portion includes between six and eight rib portions. Preferably the flange portion includes between four and twelve shoulder portions. More preferably the flange portion includes between six and ten rib portions.

Preferably the flange portion includes a plurality of apertures. Preferably a fastener can be inserted into each aperture to releasably attach the shaft member to the to the base member. Preferably each aperture is circular in cross section. Preferably the fastener is a bolt.

Preferably each of the plurality of shoulder portions has an aperture. Preferably a fastener can be inserted into each aperture to releasably attach the shaft member to the to the base member. Preferably each aperture is circular in cross section. Preferably the fastener is a bolt.

In one embodiment, each of the rib portions has an aperture. Preferably a fastener can be inserted into each aperture to releasably attach the shaft member to the to the base member. Preferably each aperture is circular in cross section. Preferably the fastener is a bolt.

In another embodiment, each of the rib portions and each of the shoulder portions has an aperture. Preferably a fastener can be inserted into each aperture to releasably attach the shaft member to the to the base member. Preferably each aperture is circular in cross section. Preferably the fastener is a bolt.

Preferably the flange portion includes between ten and twenty apertures. More preferably the flange portion includes between 14 and 18 apertures. Preferably a fastener can be inserted into each aperture to releasably attach the shaft member to the to the base member. Preferably each aperture is circular in cross section. Preferably the fastener is a bolt.

In one embodiment, the flange portion is substantially rectangular in cross section.

Preferably the shaft member includes a body portion. Preferably the body portion is elongate. Preferably the flange portion extends from the body portion. Preferably the flange portion extends laterally from the body portion. Preferably the body portion is substantially circular in cross section. Preferably the body portion has an opening. Preferably the opening extends through the body portion. More preferably the opening extends substantially longitudinally through the body portion. Preferably the body portion is substantially tubular. Preferably the body portion includes one or more keyways. Preferably each of the one or more keyways is adapted to engage with a holding portion of a tracked vehicle to movably and releasably hold the track guide assembly.

In one embodiment, the body portion includes a faceted section. Preferably the faceted section includes between six to eighteen external faces. Preferably the faceted section is an equal sided polygon in cross section. Preferably the faceted section is a ten equal sided polygon in cross section. Preferably the faceted section is between 1/6 to 2/3 of the length of the body portion.

Preferably there is a chamfered or filleted transition between the body portion and the flange portion.

Preferably the base member has a substantially planar surface. Preferably the flange portion is adapted to abut the planar surface.

In another embodiment, where an open space is defined between adjacent rib portions, the base member includes corresponding recesses to at least partially accept the rib portions. Preferably in this embodiment, the apertures are located in the ribs and fasteners can be inserted into the apertures to releasably attach the shaft member to the base member. Preferably the fasteners are bolts. Preferably the base member includes threaded holes to accept the bolts.

In another embodiment, the apertures are located in the base member. Preferably the fasteners can be inserted into the apertures to releasably secure the base member to the shaft member. Preferably the fasteners are bolts. Preferably the shaft member includes threaded holes to accept the bolts.

Preferably the base member has a locating projection. Preferably the locating projection is insertable into the opening in the body portion. Preferably the locating projection is substantially circular in cross section.

Preferably when the base member is attached to the shaft member, an O-ring is located at least partially between the base member and the shaft member. Preferably the O-ring is located around a portion of the locating projection.

Preferably one of the base member or the shaft member has an alignment projection. Preferably the other of the base member or the shaft member has an alignment recess. Preferably the alignment projection is insertable into the alignment recess to align the base member and the shaft member. In one embodiment, there are a plurality of alignment projections, and a plurality of alignment recesses.

In one embodiment, the base member has an attachment portion. Preferably the base member also has a support portion. Preferably the attachment portion is adapted to be attached to the flange portion. Preferably the support portion is adapted to operatively support the track roller. Preferably the attachment portion is attached to or attachable to the support portion.

Preferably the track guide assembly is predominantly made of metal. More preferably the track guide assembly is predominantly made of steel.

In another aspect, the present invention broadly resides in a track guide assembly having
   a base member operatively attachable to one or more track rollers; and
   a shaft member releasably attached or attachable to the base member, the shaft member including an elongate body portion and a flange portion,
   wherein the flange portion includes a plurality of rib portions and a plurality of shoulder portions, each of the plurality of rib portions spaced from an adjacent rib member by one of the plurality of shoulder portions, each of the plurality of rib portions having a greater thickness than each of the plurality of shoulder portions, and wherein each of the plurality of shoulder portions has an aperture through which a fastener can be inserted to releasably attach the shaft member to the to the base member.

In a further aspect, the present invention broadly resides in a method of replacing a shaft member of a track guide assembly as described in this specification, including the steps of
   detaching the shaft member from the base member; and
   releasably attaching a new shaft member to the base member.

Preferably the step of detaching the shaft member from the base member includes disengaging one or more fasteners between the shaft member and the base member. Preferably the fasteners are bolts. Preferably the step of detaching the shaft member from the base member includes unthreading one or more bolts from the base member.

Preferably the step of releasably attaching a new shaft member to the base member includes attaching the new shaft member using one or more fasteners.

Preferably the fasteners are bolts. Preferably the step of releasably attaching a new shaft member to the base member includes inserting bolts through one or more apertures in the shaft member and threading the bolts into the base member.

Preferably the one or more apertures are located in the flange portion of the shaft member.

In another aspect, the present invention broadly resides in a track guide assembly having
   a base member operatively attachable to a track roller; and
   a shaft member releasably attached or attachable to the base member, the shaft member including a flange portion,
   wherein the flange portion is adapted to be attached to the base member by a plurality of fasteners.

In one embodiment, the base member is attached or attachable to a support member. Preferably the support member is adapted to support the track roller.

Preferably the track guide assembly is made of metal. Preferably the track guide assembly is machined from cast metal.

In a further aspect, the present invention broadly resides in earth moving machinery including one or more track guide assemblies as described in this specification. Preferably the earth moving machinery is an earth moving vehicle.

In another aspect, the present invention broadly resides in a tracked vehicle including one or more track guide assemblies as described in this specification. Preferably the tracked vehicle is an earth moving vehicle.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DESCRIPTION OF THE INVENTION

Figure 1:
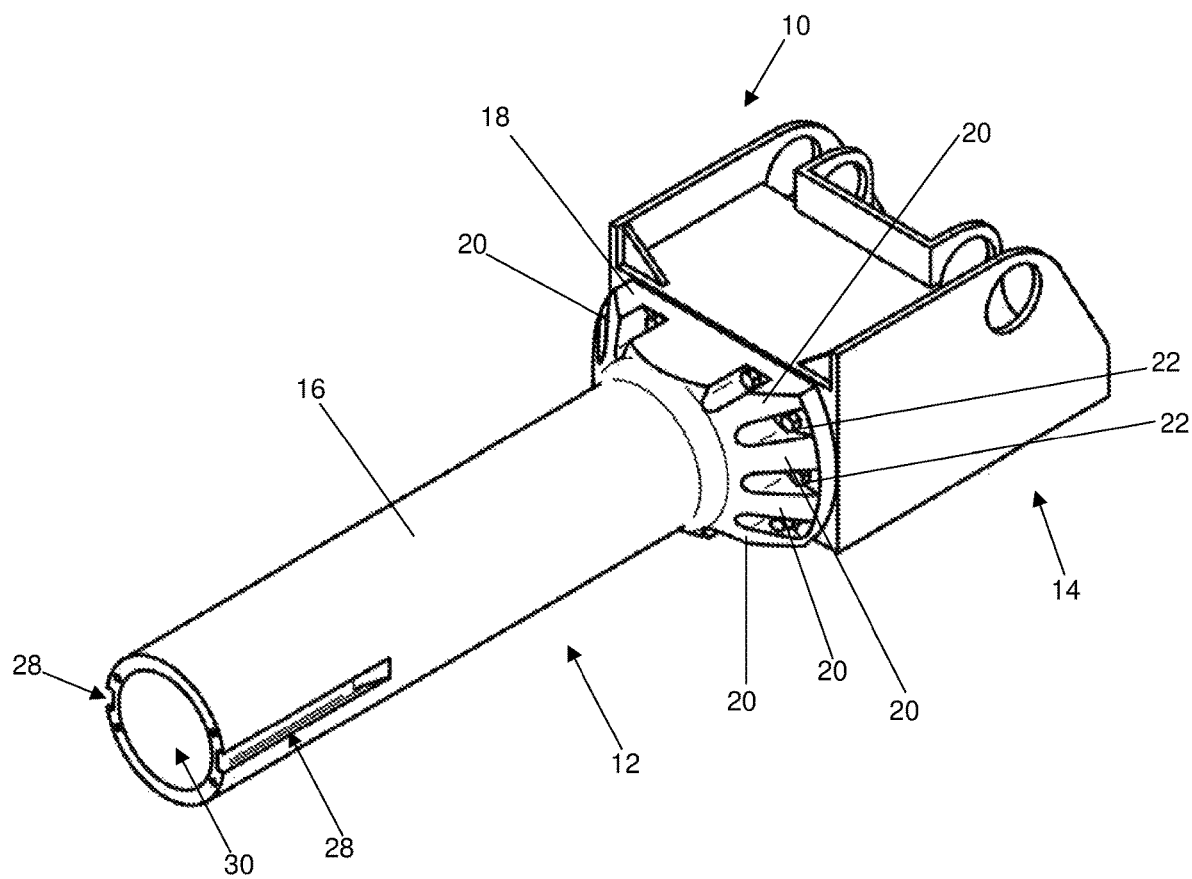
FIG. 1 is a perspective view of a track guide assembly according to an embodiment of the present invention.
Figure 2:
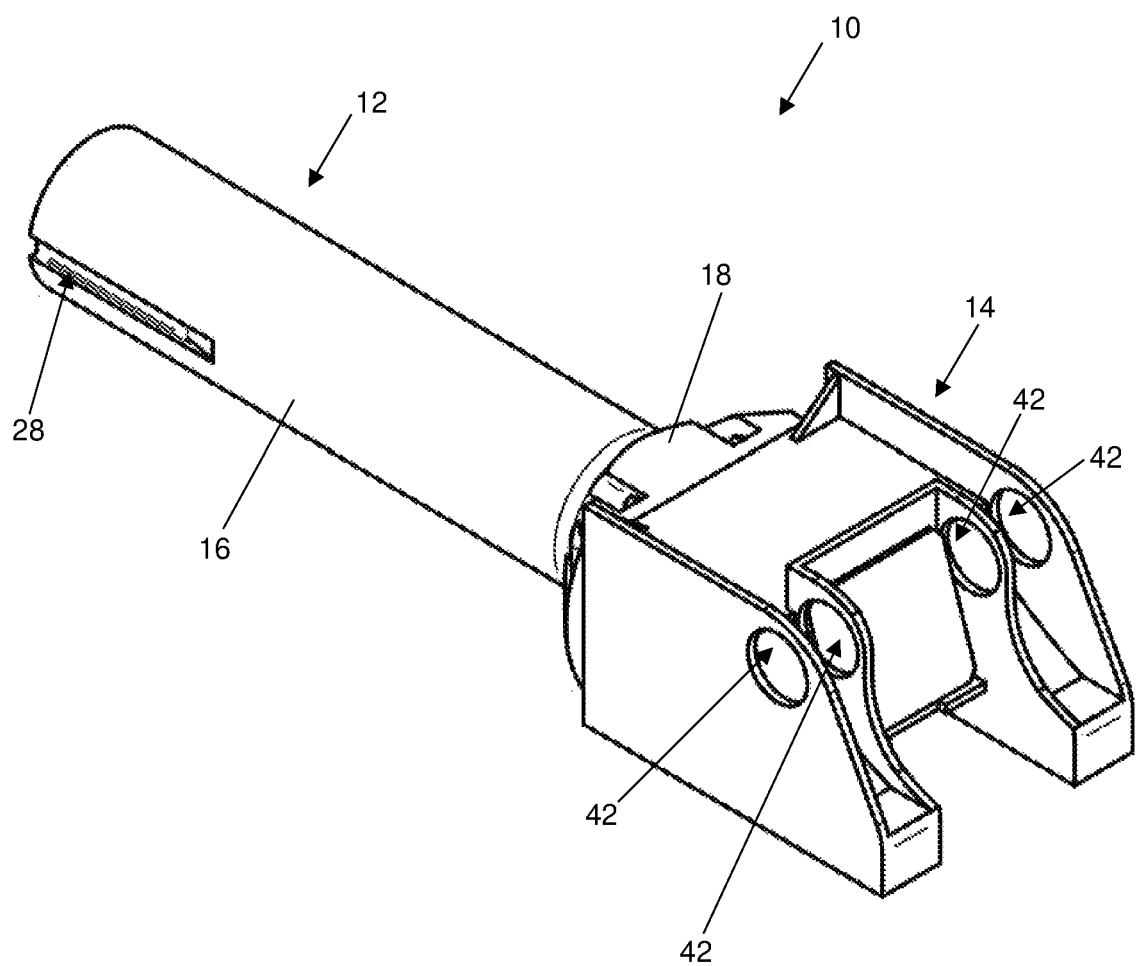
FIG. 2 is a perspective view of the track guide assembly of FIG. 1.
Figure 3:
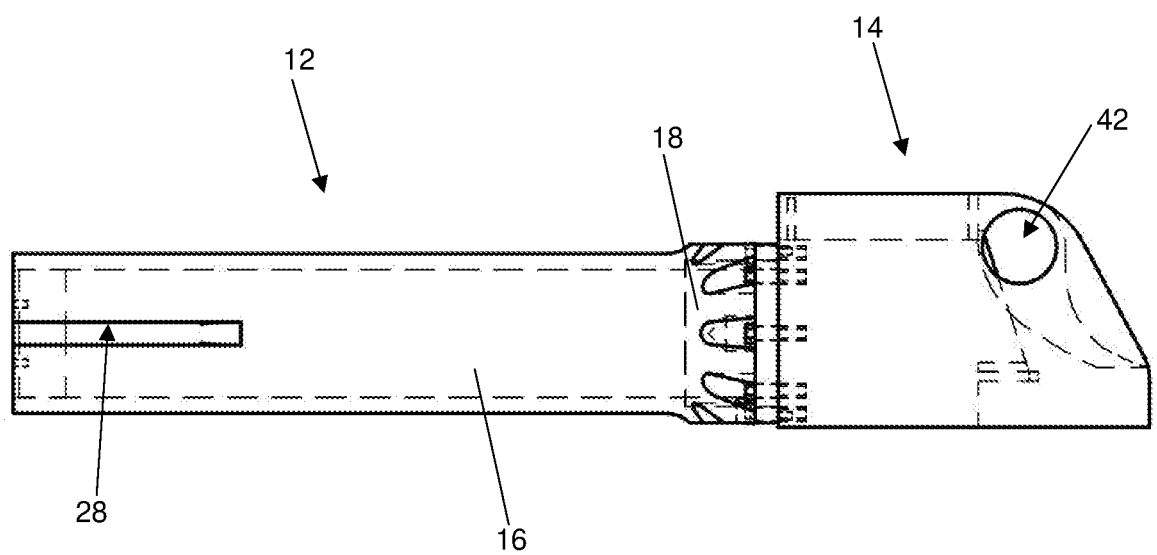
FIG. 3 is a side view of the track guide assembly of FIG. 1.
Figure 4:
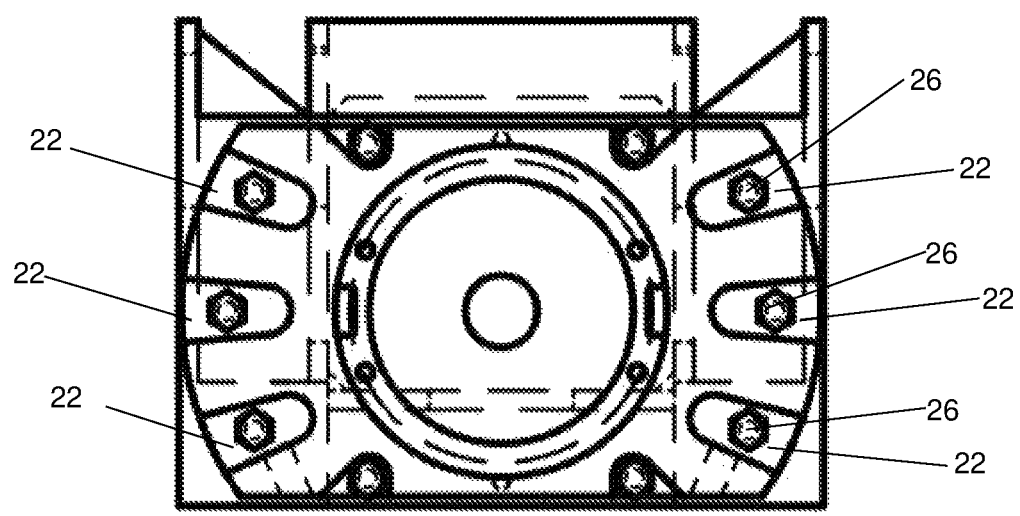
FIG. 4 is an end view of the track guide assembly of FIG. 1.
Figure 5:
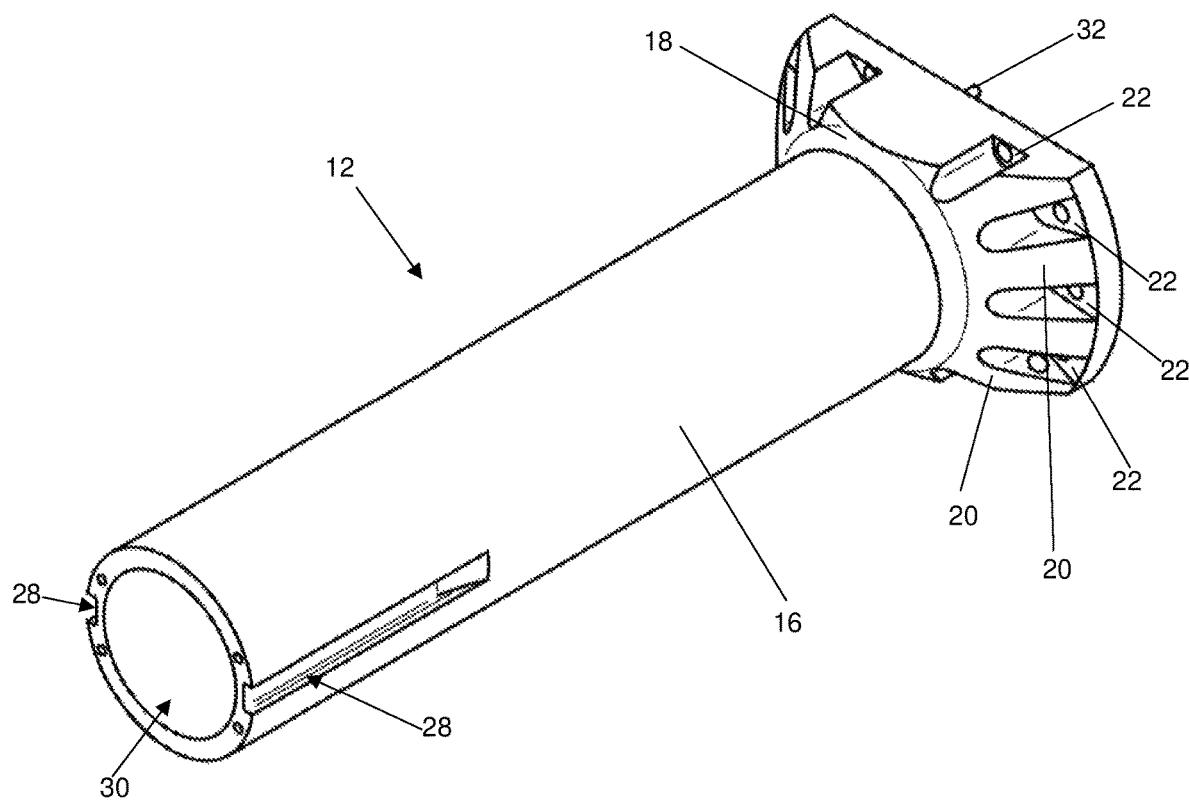
FIG. 5 is a perspective view of the shaft member of FIG. 1.
Figure 6:
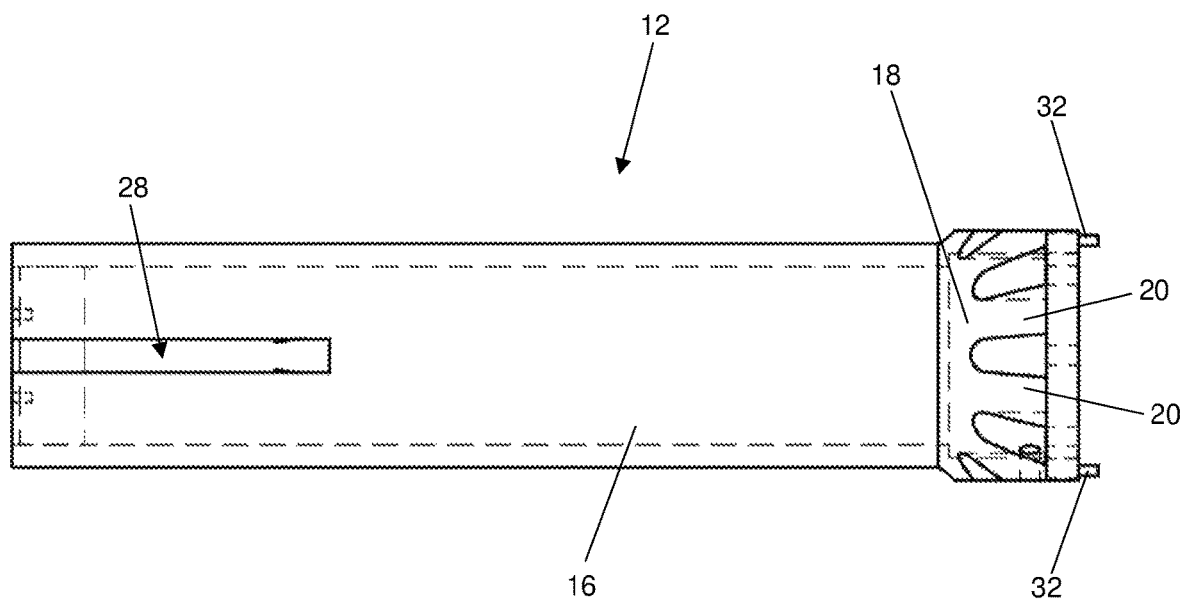
FIG. 6 is a side view of the shaft member of FIG. 1.
Figure 7:
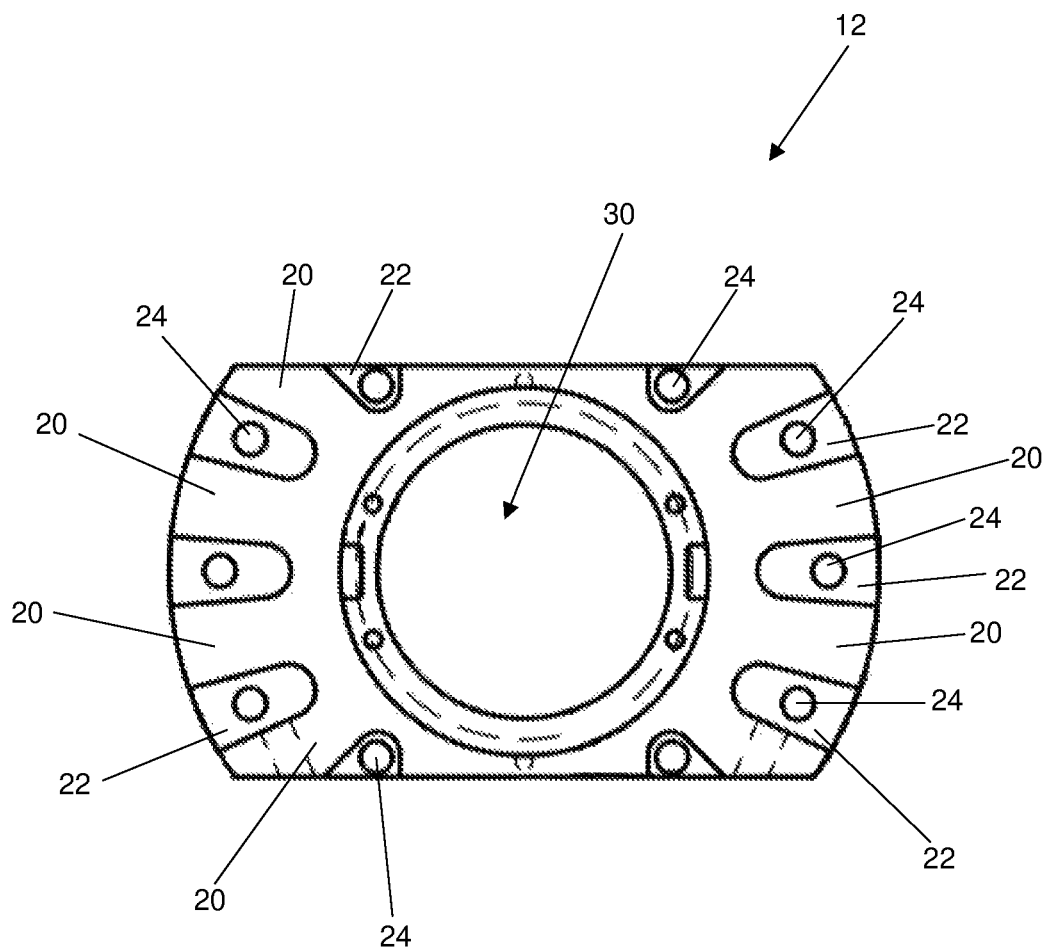
FIG. 7 is an end view of the shaft member of FIG. 1.
Figure 8:
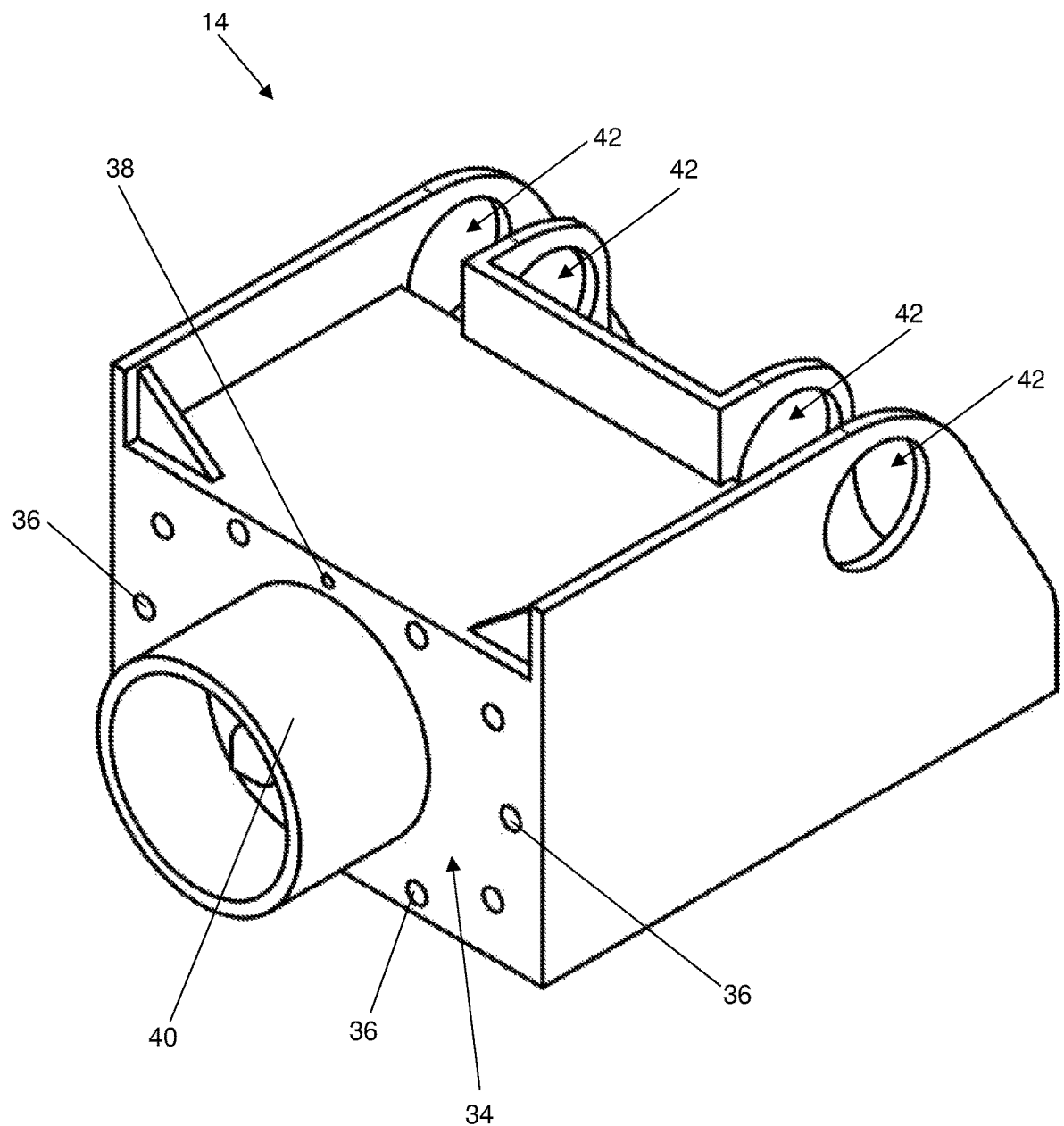
FIG. 8 is a perspective view of the base member of FIG. 1.
Figure 9:
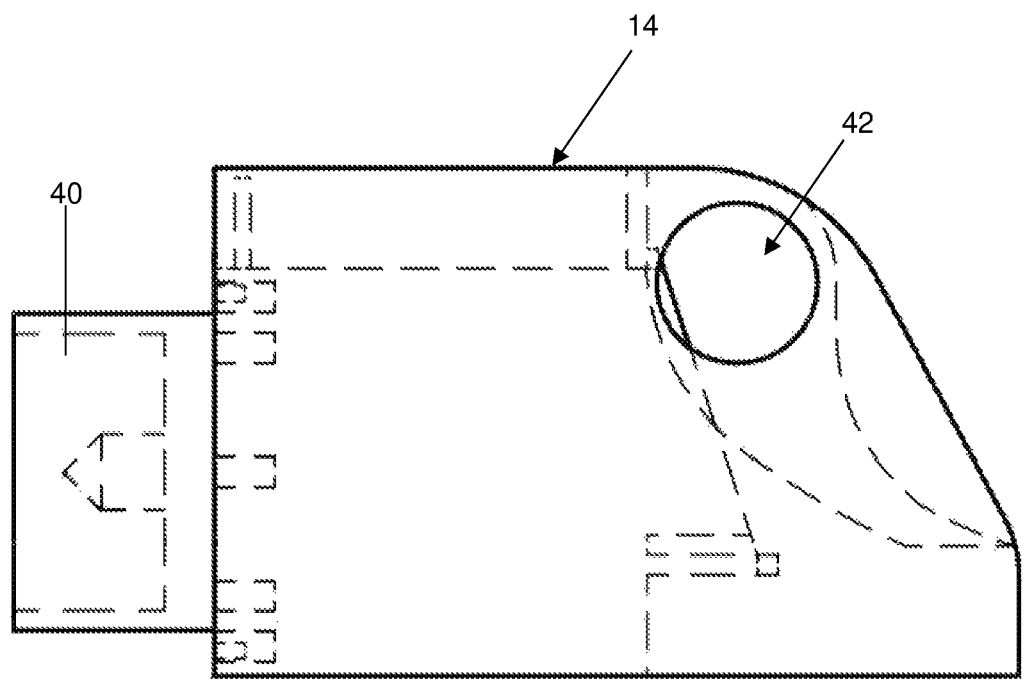
FIG. 9 is a side view of the base member of FIG. 1.
Figure 10:
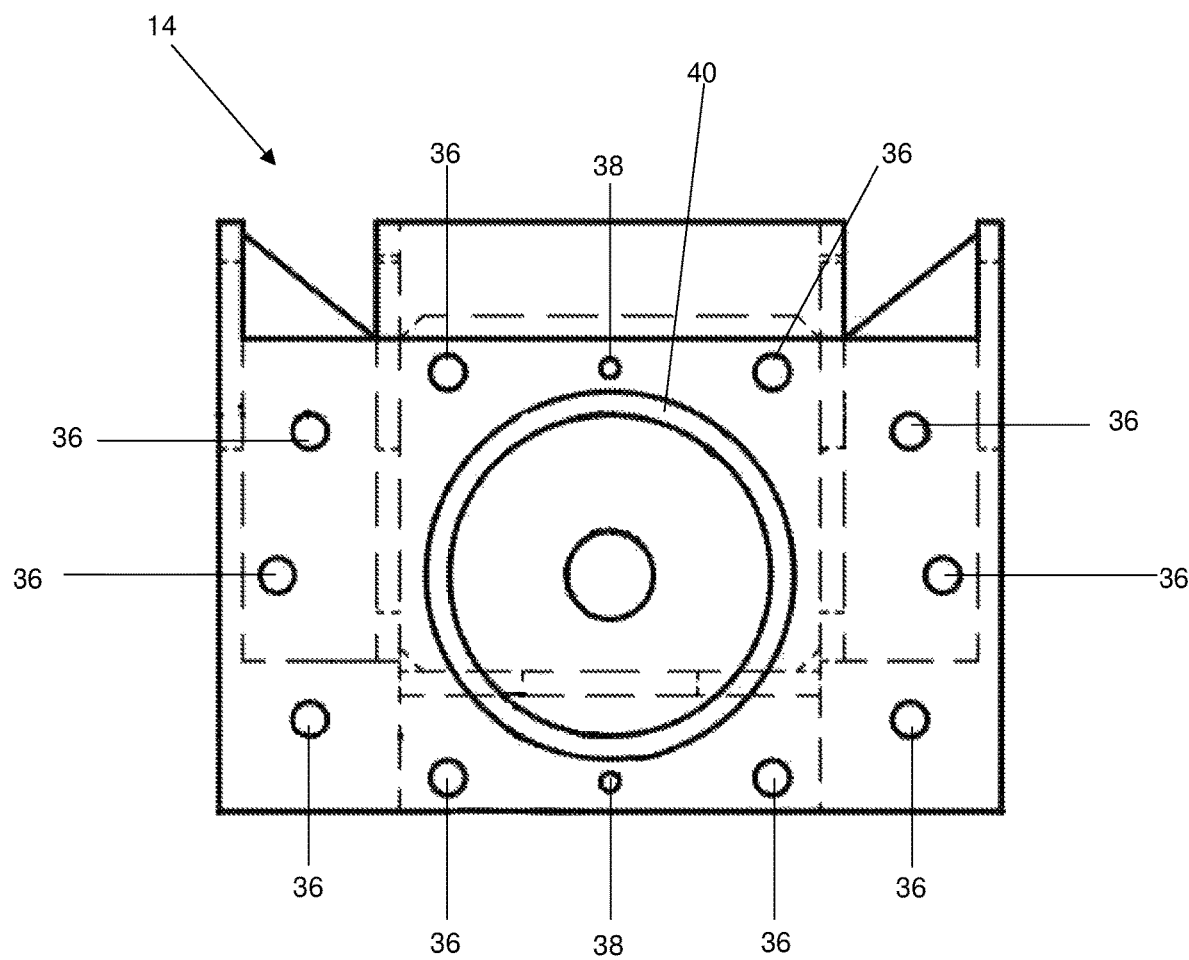
FIG. 10 is an end view of the base member of FIG. 1.

With reference to FIGS. 1 to 4, there is shown a track guide assembly 10 according to an embodiment of the present invention. The track guide assembly 10 has a shaft member 12 releasably attached to a base member 14. FIGS. 5 to 7 show the shaft member 12 in more detail, and FIGS. 8 to 10 show the base member 14 in more detail.

The shaft member 12 has an elongate body portion 16. A flange portion 18 extends from the body portion 16. The flange portion 18 has a plurality of rib portions 20 spaced from each other. The flange portion 18 includes a plurality of shoulder portions 22. The shoulder portions 22 include apertures 24. The apertures 24 are adapted to receive fasteners in the form of bolts 26 to releasably attach the shaft member 12 to the base member 14.

The shaft member 12 includes two keyways 28. The keyways 28 are adapted to engage with a holding portion of a tracked vehicle (not shown) to movably and releasably hold the track guide assembly 10. The shaft member 12 has an opening 30 extending therethrough. The shaft member 12 also includes an alignment projections 32.

The base member 14 has a planar surface 34 to abut the flange portion 18. The planar surface 34 includes threaded holes 36 to accept the bolts 26. The base member 14 also includes alignment recesses 38 to receive the alignment projections 32 to align the shaft member 12 to the base member 14. The base member 14 also includes a locating projection 40. The locating projection 40 is adapted to be inserted into the opening 30 of the shaft member 12 to locate the shaft member 12 relative to the base member 14.

The base member 14 includes apertures 42. The apertures 42 are adapted to receive an axle of one or more track rollers (not shown).

Figure 11:
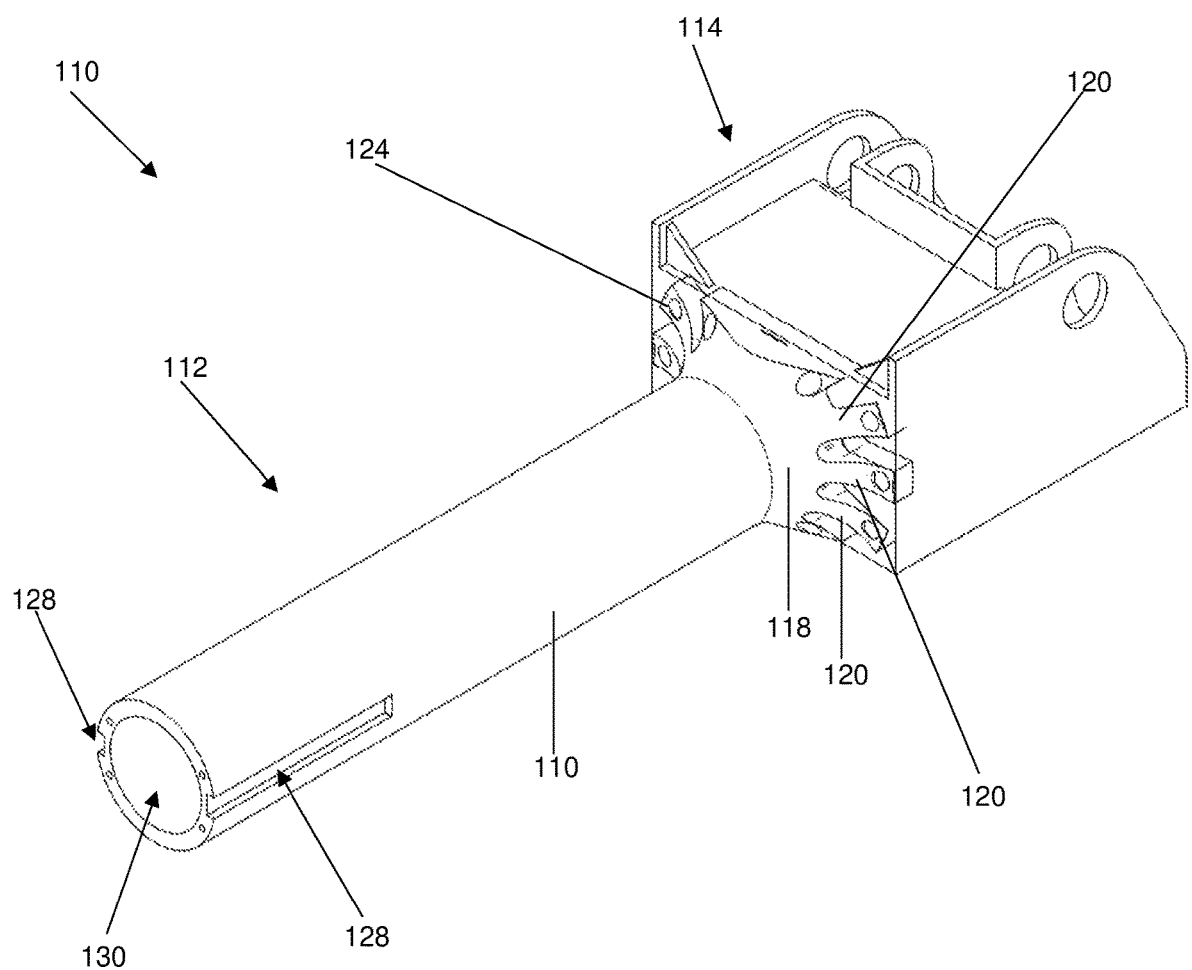
FIG. 11 is a perspective view of a track guide assembly according to another embodiment of the present invention.
Figure 12:
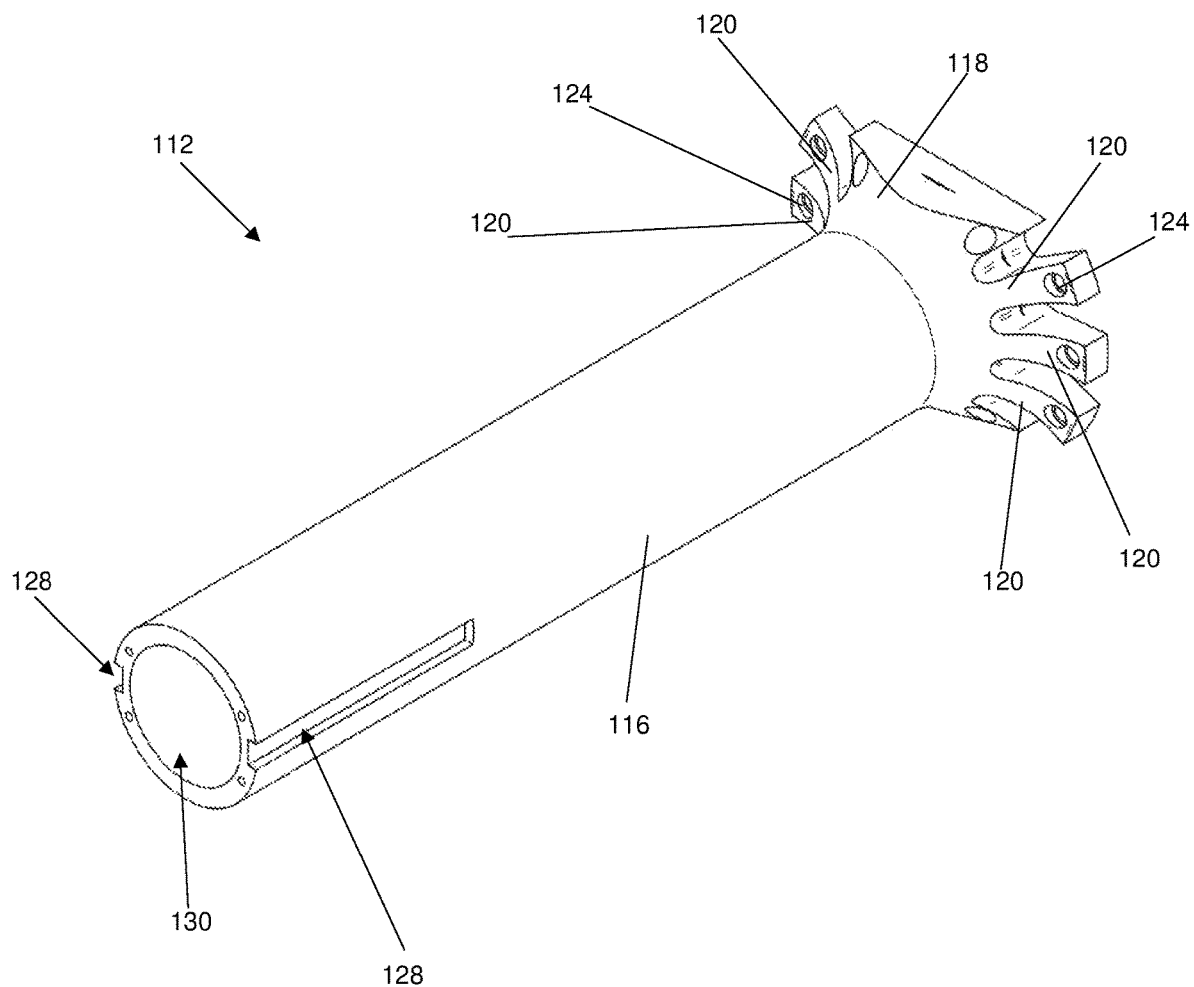
FIG. 12 is a perspective view of the shaft member of FIG. 11.
Figure 13:
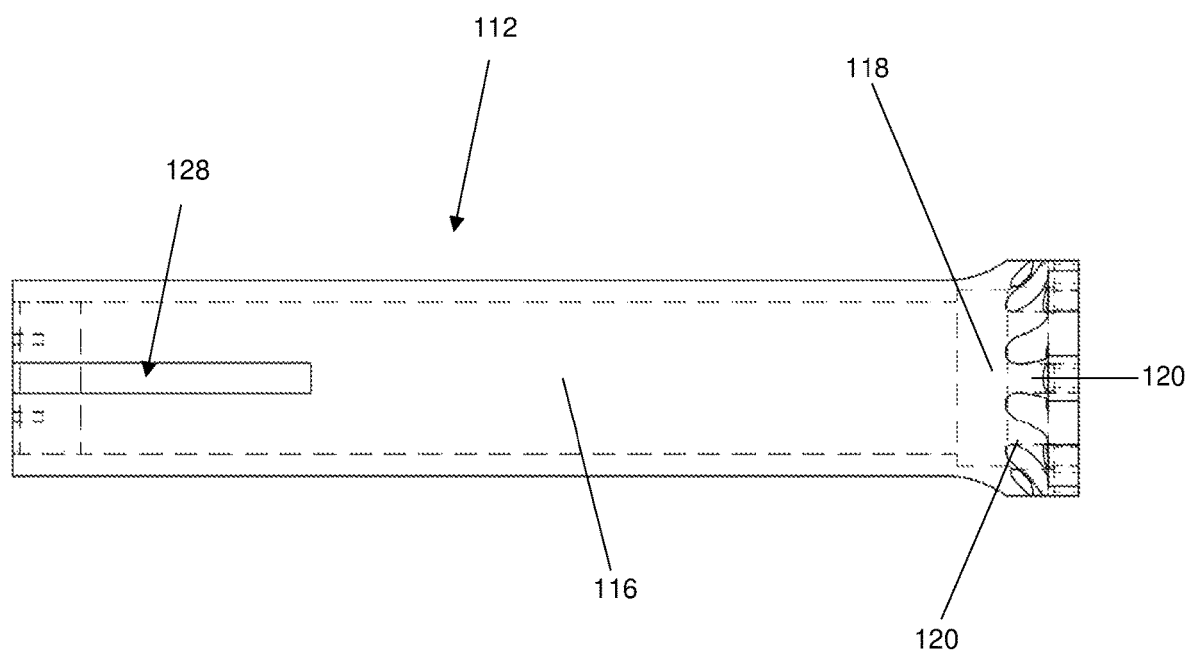
FIG. 13 is a side view of the shaft member of FIG. 11.
Figure 14:
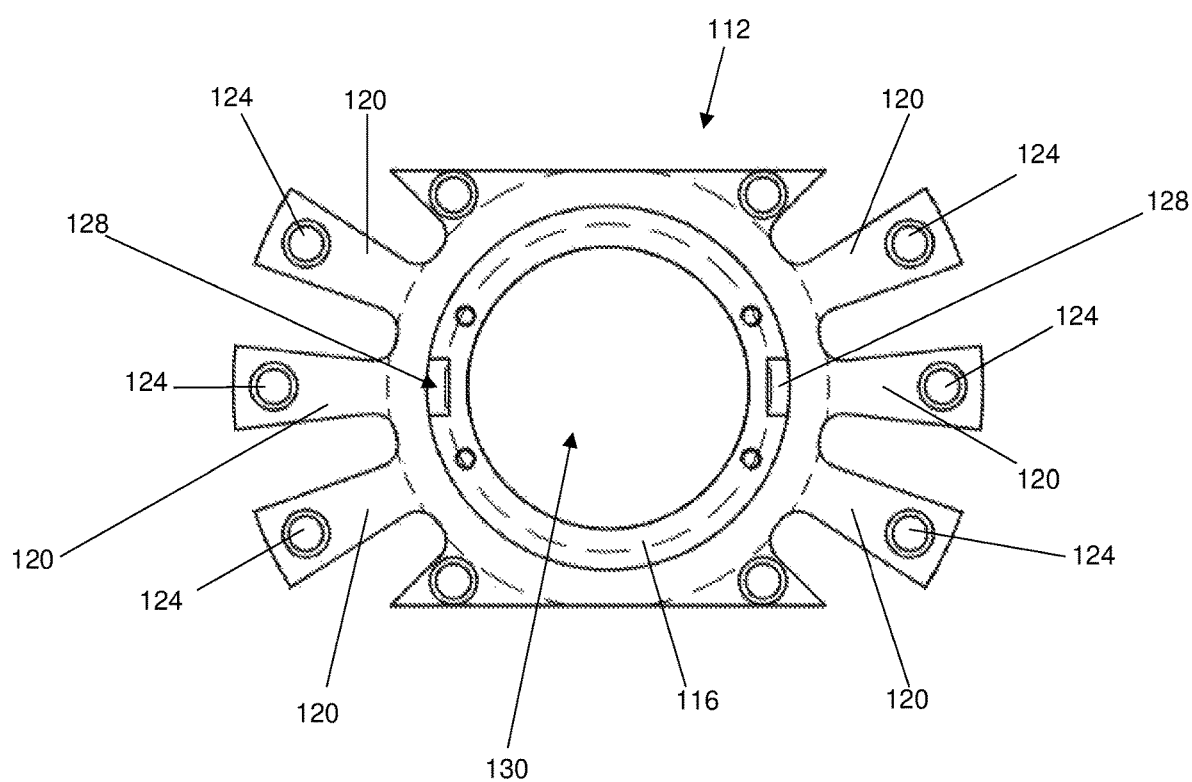
FIG. 14 is an end view of the shaft member of FIG. 11.
Figure 15:
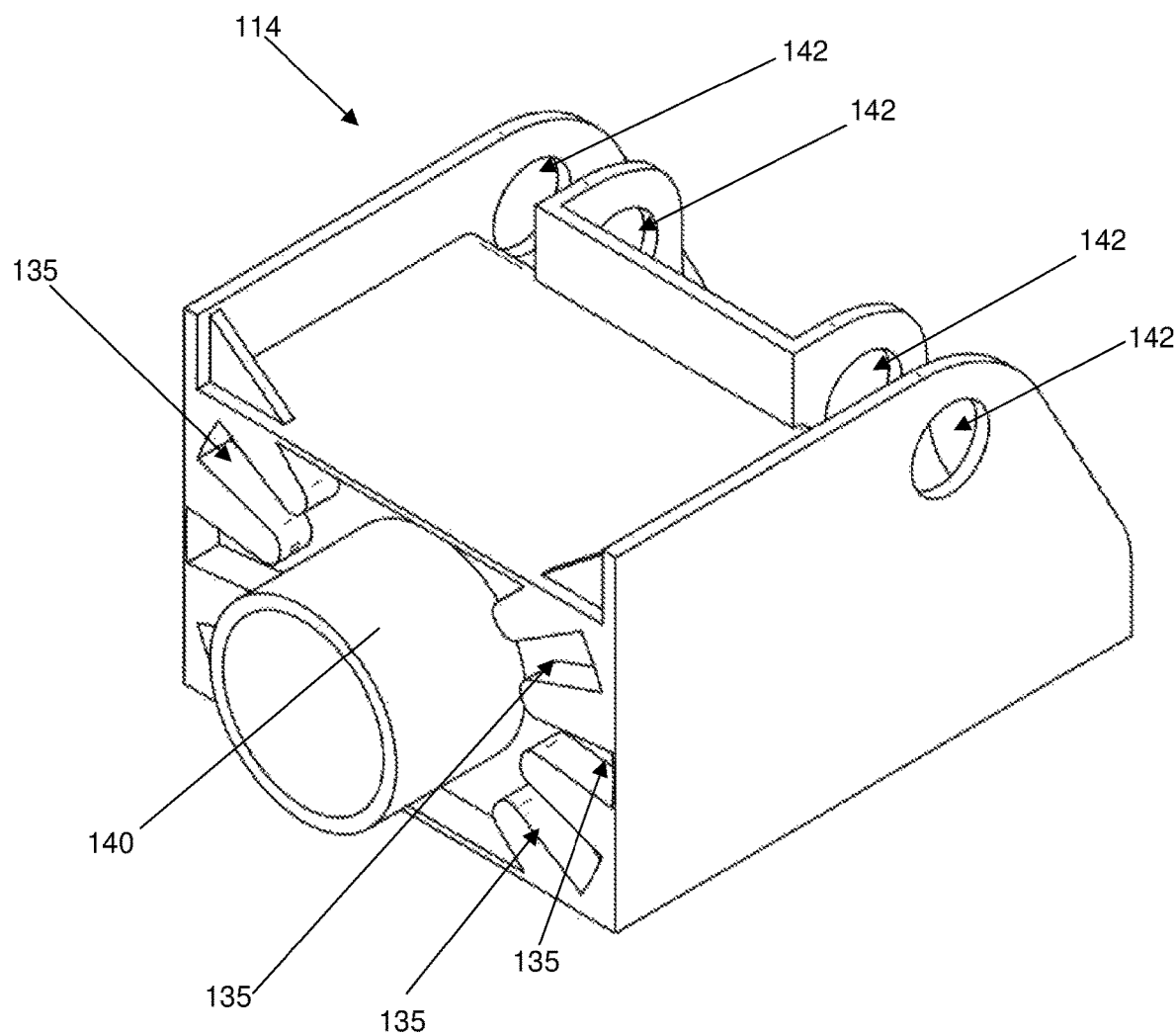
FIG. 15 is a perspective view of the base member of FIG. 11.
Figure 16:
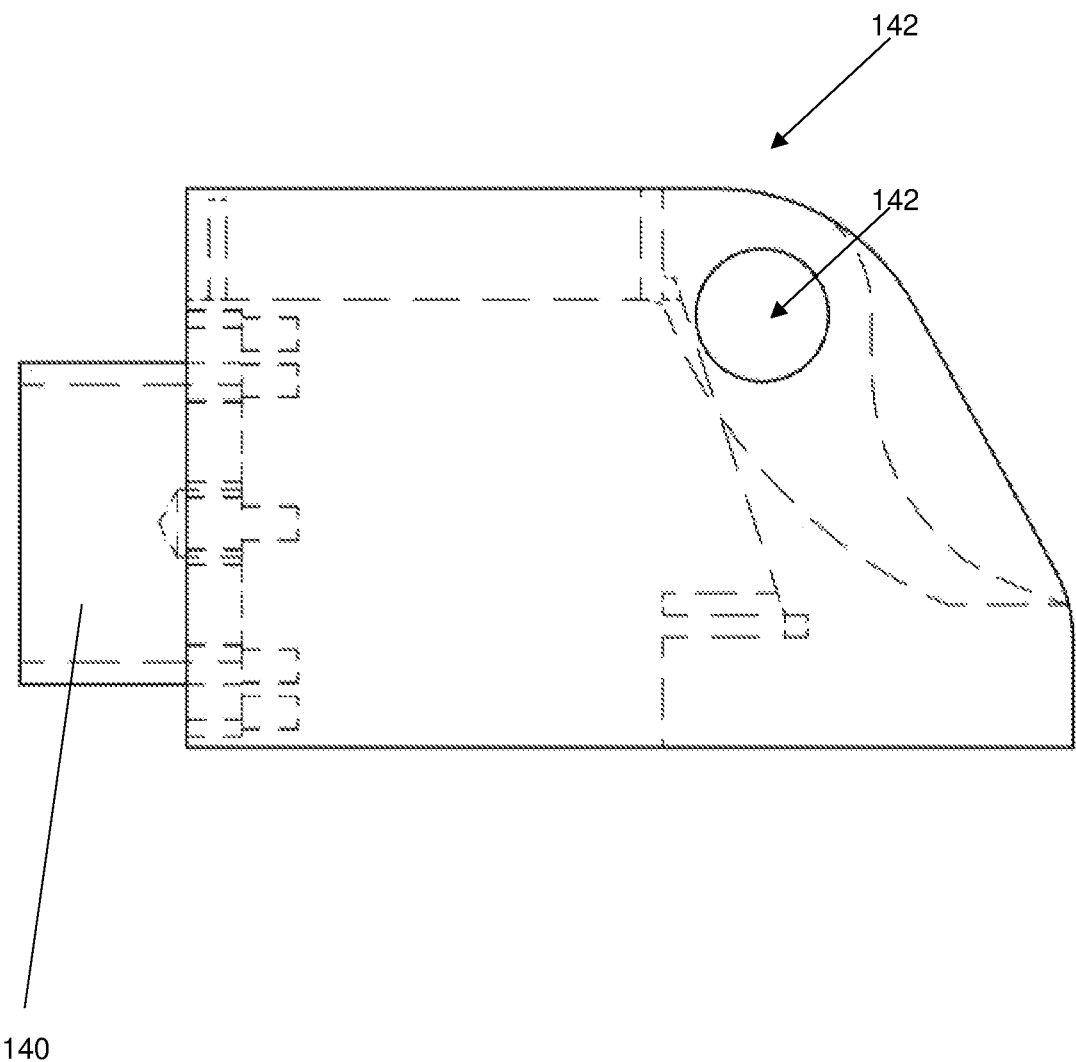
FIG. 16 is a side view of the base member of FIG. 11.
Figure 17:
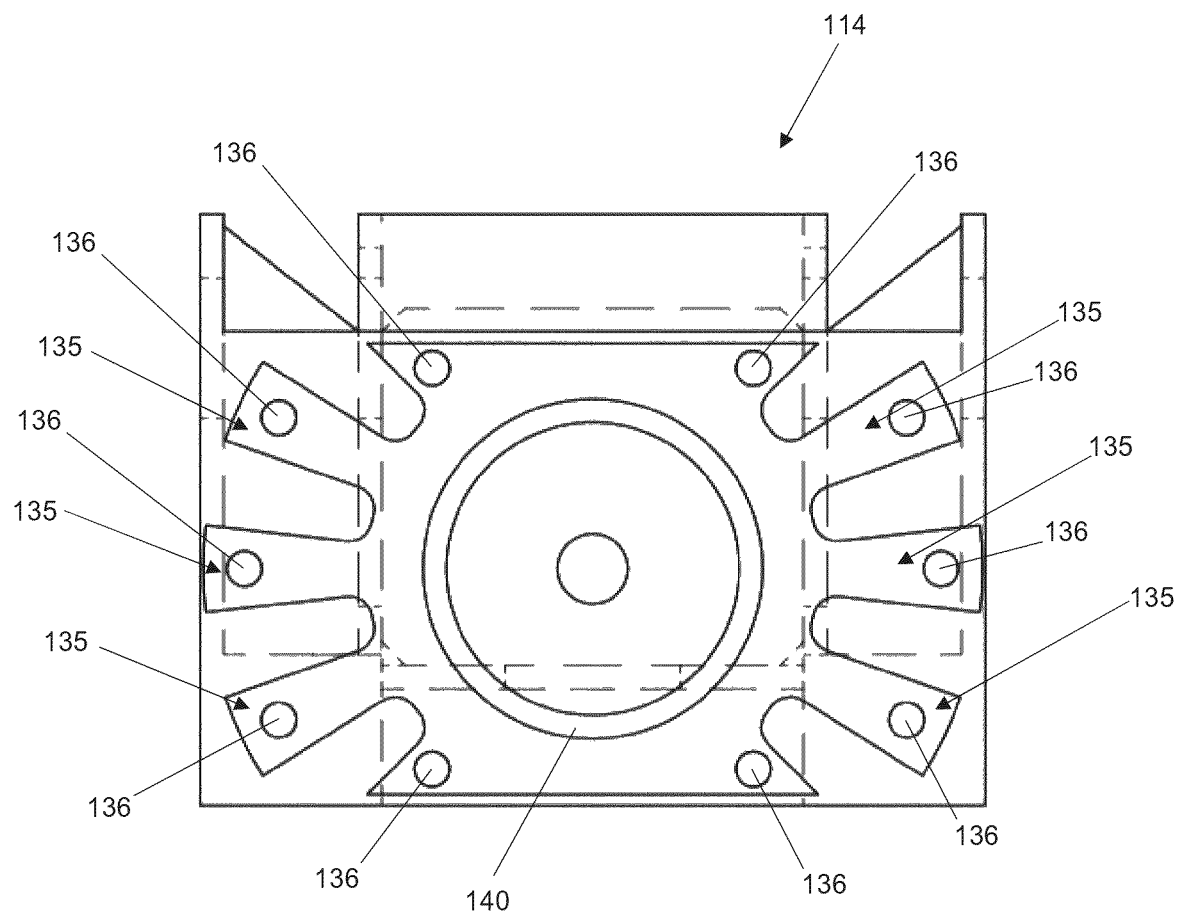
FIG. 17 is an end view of the base member of FIG. 11.
Figure 18:
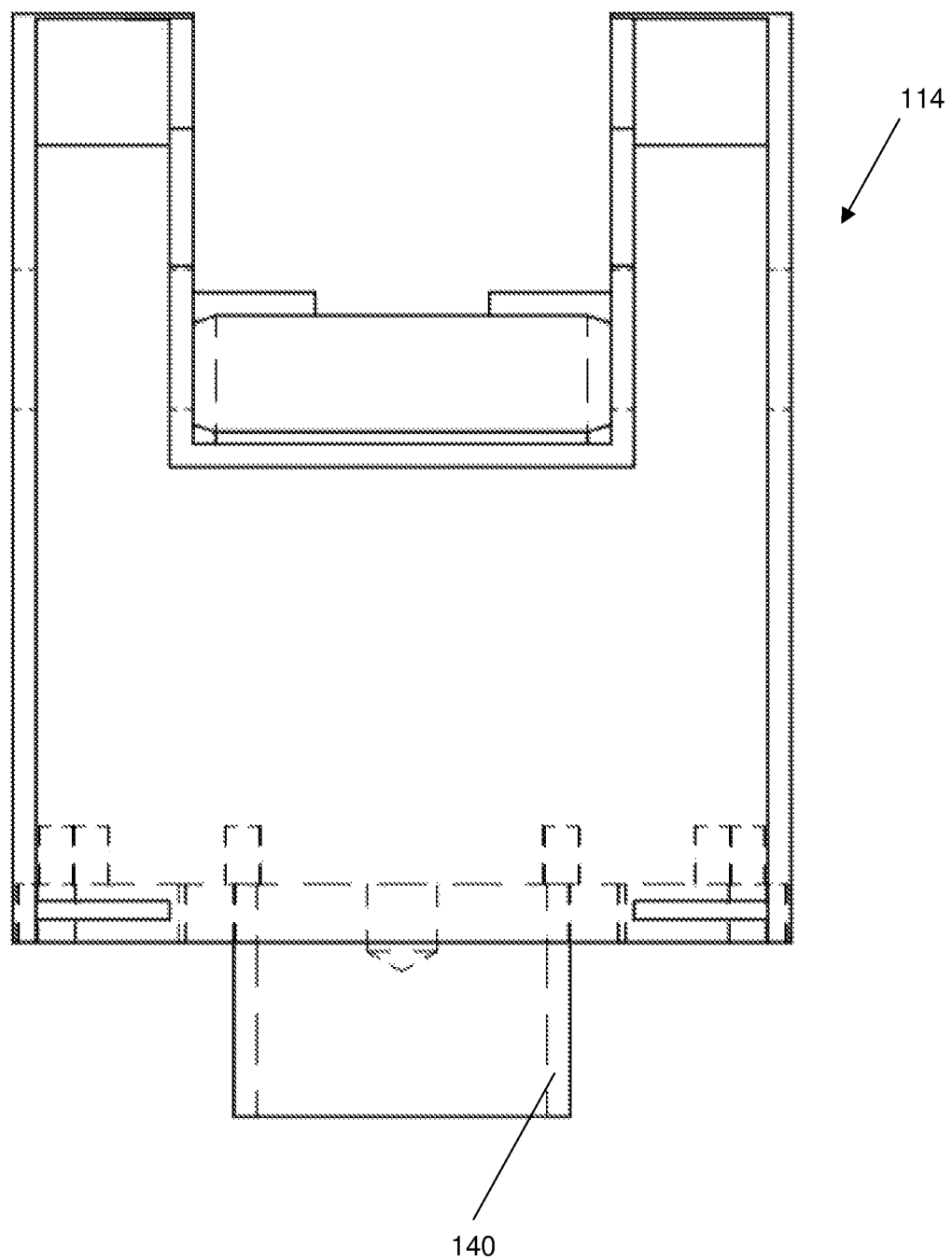
FIG. 18 is a top view of the base member of FIG. 11.

With reference to FIG. 11 there is shown a track guide assembly 110 according to another embodiment of the present invention. The track guide assembly 110 is similar to the track guide assembly 10 of FIG. 1, and similar numbering with a prefix of 1 will be used. The track guide assembly 110 has a shaft member 112 releasably attached to a base member 114. FIGS. 12 to 14 show the shaft member 112 in more detail, and FIGS. 14 to 18 show the base member 114 in more detail.

The shaft member 112 has an elongate body portion 116. A flange portion 118 extends from the body portion 116. The flange portion 118 has a plurality of rib portions 120 spaced from each other. The rib portions 120 include apertures 124. The apertures 124 are adapted to receive fasteners in the form of bolts (not shown) to releasably attach the shaft member 112 to the base member 114.

The shaft member 112 includes two keyways 128. The keyways 128 are adapted to engage with a holding portion of a tracked vehicle (not shown) to movably and releasably hold the track guide assembly 110. The shaft member 112 has an opening 130 extending therethrough.

The base member 114 has recesses 135 to accept the rib portions 120. The base member 114 includes threaded holes 136 to accept the bolt (not shown) to releasably secure the shaft member 112 to the base member 114. The base member 114 also includes a locating projection 140. The locating projection 140 is adapted to be inserted into the opening 130 of the shaft member 112 to locate the shaft member 112 relative to the base member 114.

The base member 114 includes apertures 142. The apertures 142 are adapted to receive an axle of one or more track rollers (not shown).

Figure 19:
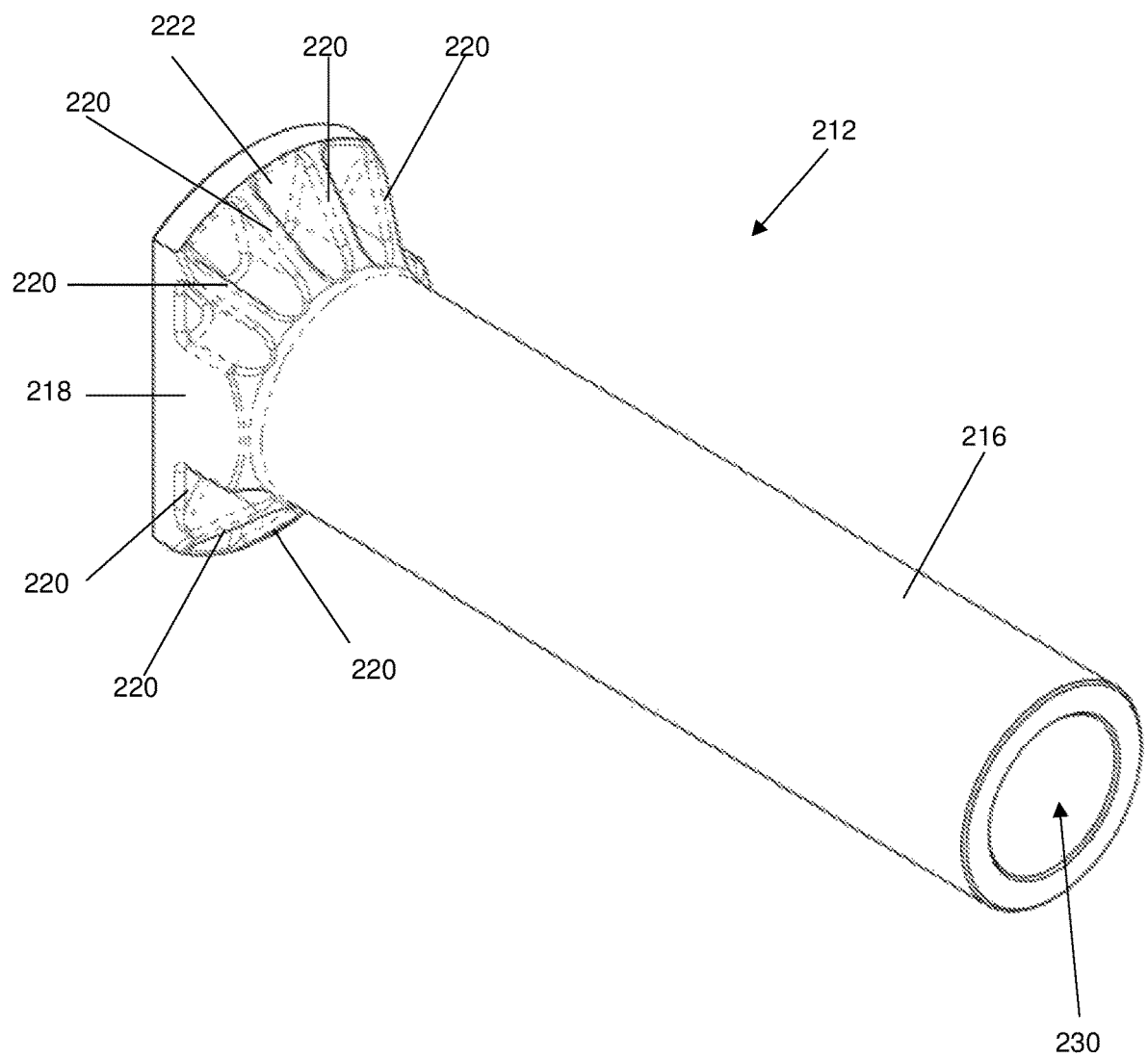
FIG. 19 is a perspective view of a shaft member according to a further embodiment of the present invention.

With reference to FIG. 19, there is shown a shaft member 212 according to a further embodiment of the present invention. The shaft member 212 is similar to the shaft member 12 of FIG. 1, and similar numbering with the prefix of 2 will be used.

The shaft member 212 has an elongate body portion 216. A flange portion 218 extends from the body portion 216. The flange portion 218 has a plurality of rib portions 220 spaced from each other. The flange portion 218 includes a plurality of shoulder portions 222. The shoulder portions 222 include apertures (not shown). The apertures are adapted to receive bolts (not shown) to releasably attach the shaft member 212 to a base member (see item 214 in FIG. 20).

The shaft member 212 has an opening 230 extending therethrough.

Figure 20:
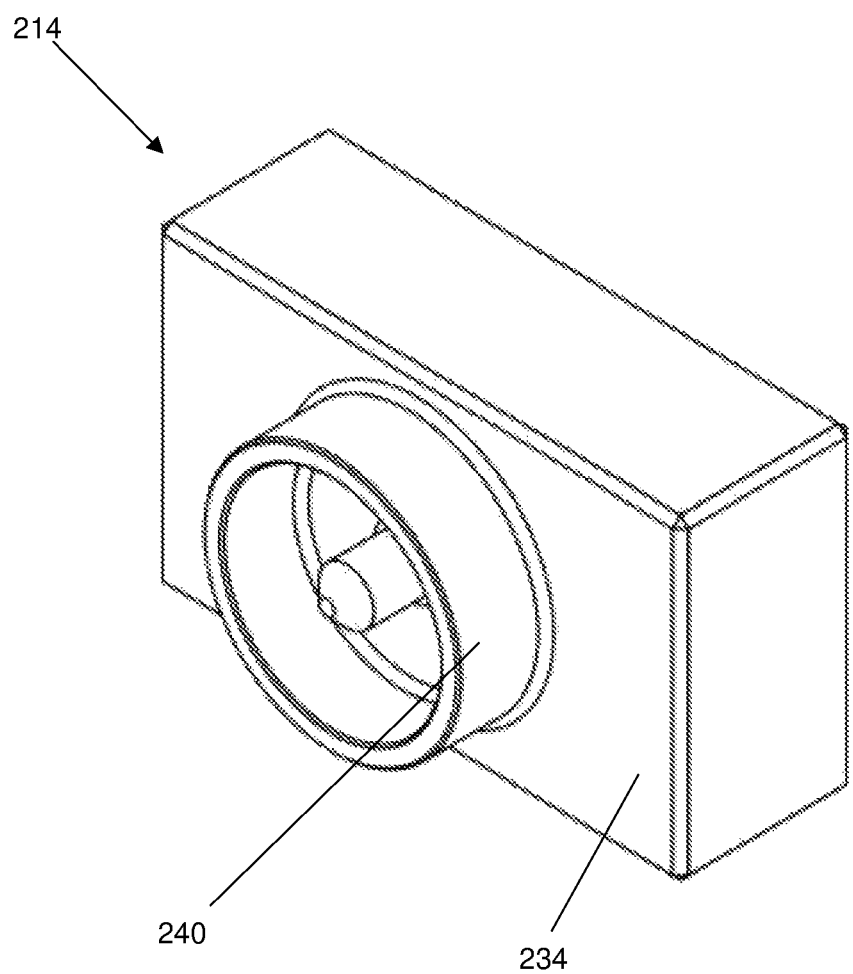
FIG. 20 is a perspective view of a base member corresponding to the embodiment of FIG. 19.
Figure 21:
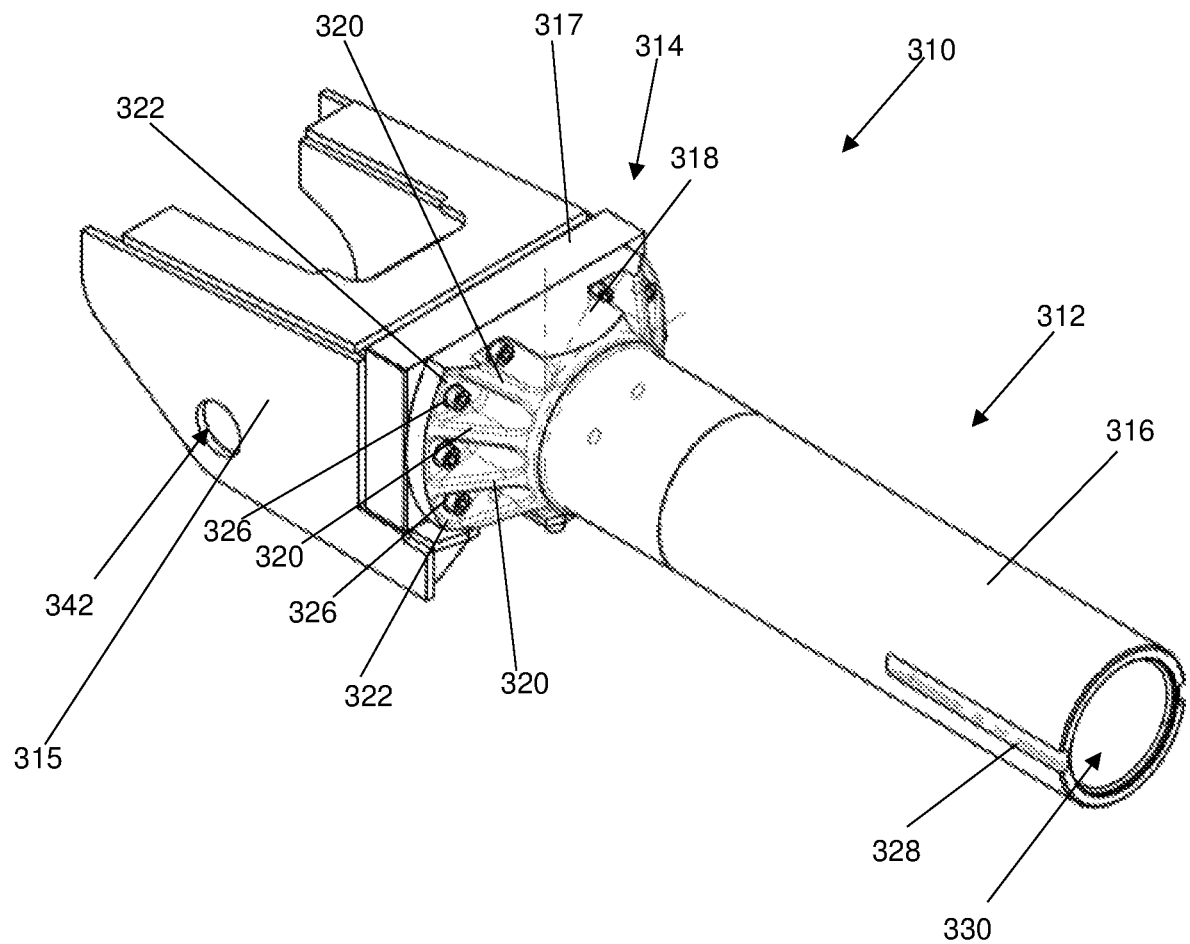
FIG. 21 is a perspective view of a track guide assembly according to a further embodiment of the present invention.
Figure 22:
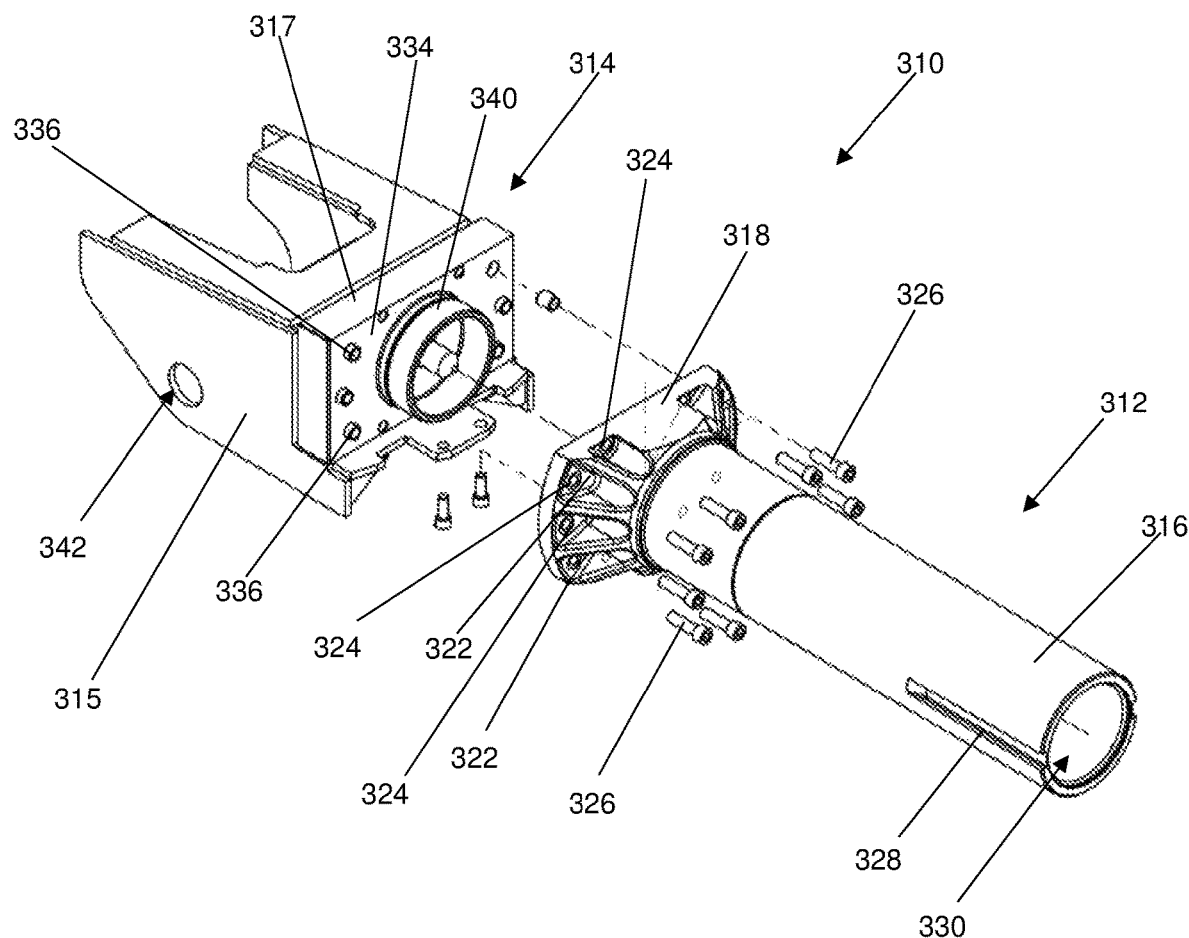
FIG. 22 is a partially exploded view of the track guide assembly of FIG. 21.
Figure 23:
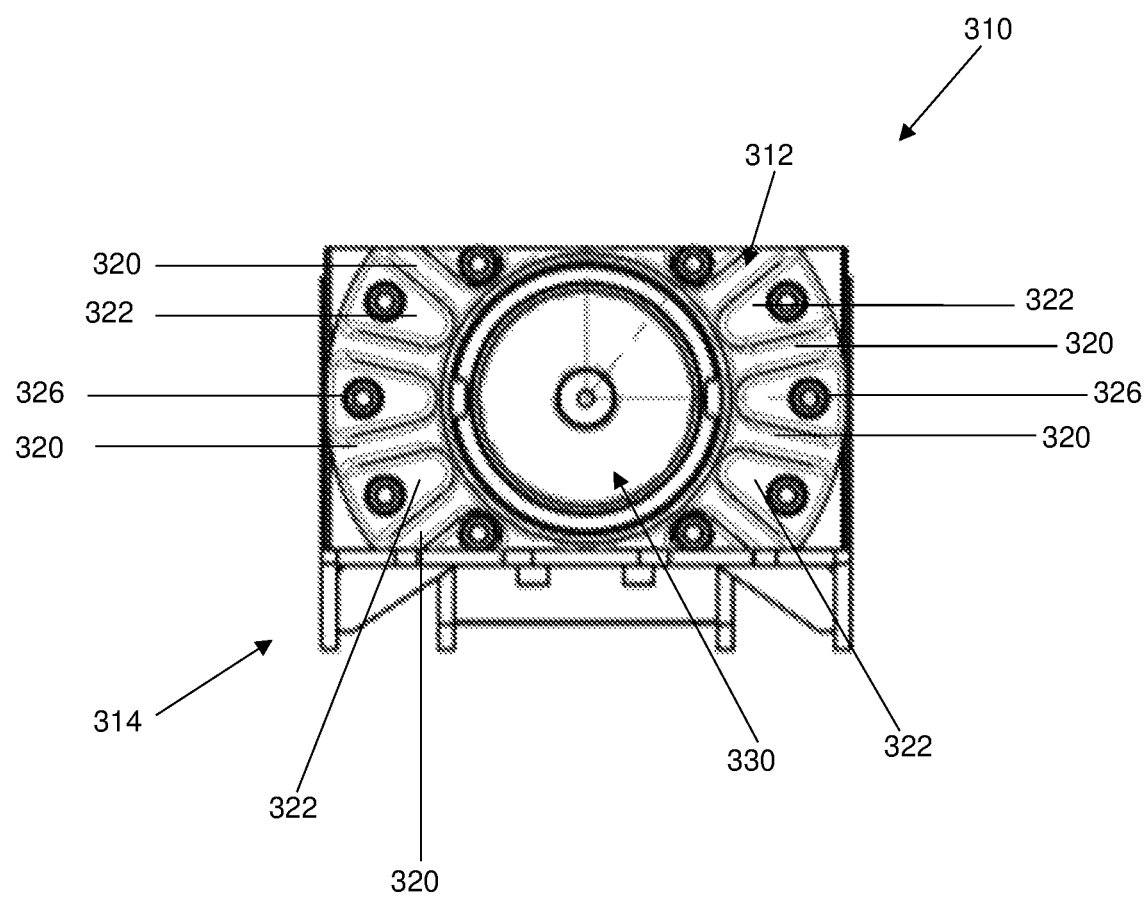
FIG. 23 is an end view of the track guide assembly of FIG. 21.
Figure 24:
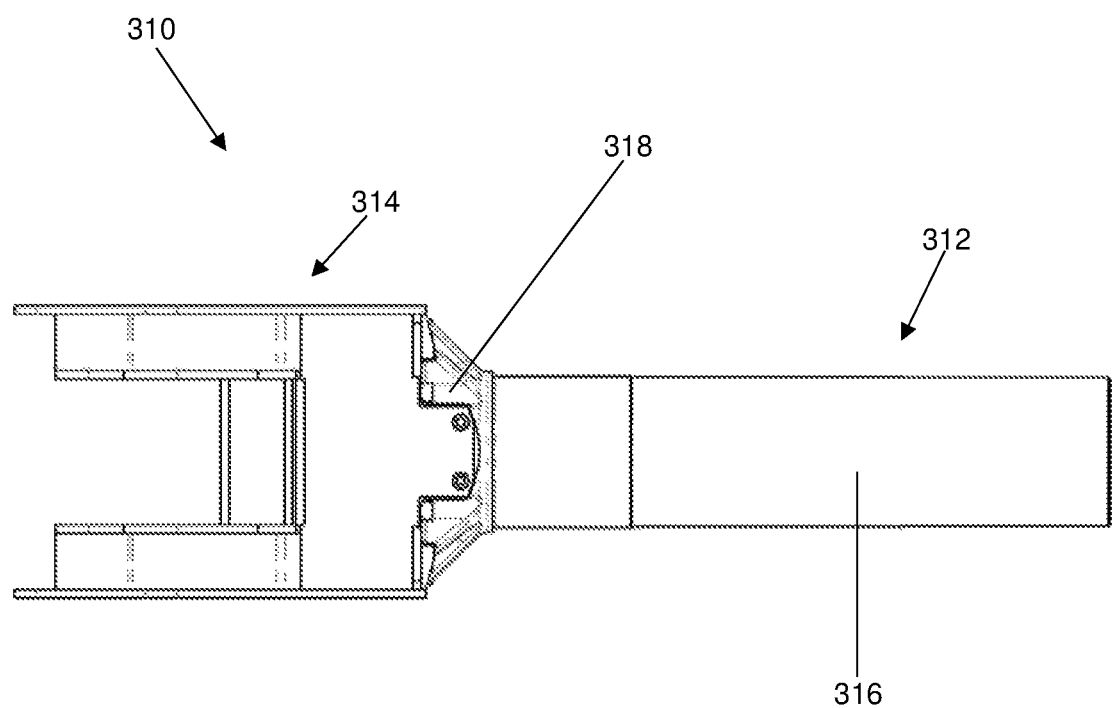
FIG. 24 is a bottom view of the track guide assembly of FIG. 21.
Figure 25:
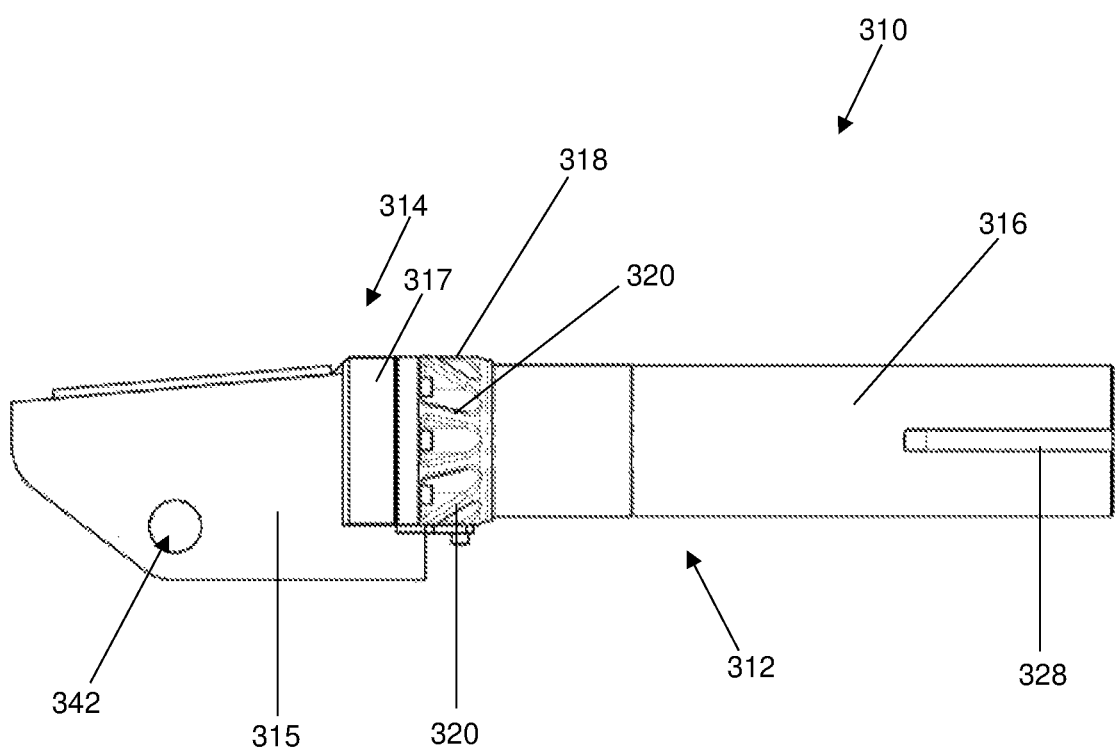
FIG. 25 is a side view of the track guide assembly of FIG. 21.

With reference to FIG. 20, there is shown a base member 214, which is attachable to the shaft member 212 of FIG. 19 to define a track guide assembly.

The base member 214 has a planar surface 234 to abut the flange portion 218 of the shaft member 212 of FIG. 19. The base member 214 also includes a locating projection 240. The locating projection 240 is adapted to be inserted into the opening 230 of the shaft member 212 to locate the shaft member 212 relative to the base member 214.

The base member 214 is attachable to a support member (not shown), the support member adapted to support one or more track rollers.

With reference to FIGS. 21 to 25, there is shown a track guide assembly 310 according to an embodiment of the present invention. The track guide assembly 310 has a shaft member 312 releasably attached to a base member 314.

The shaft member 312 has an elongate body portion 316. A flange portion 318 extends from the body portion 316. The flange portion 318 has a plurality of rib portions 320 spaced from each other. The flange portion 318 includes a plurality of shoulder portions 322. The shoulder portions 322 include apertures 324. The apertures 324 are adapted to receive fasteners in the form of bolts 326 to releasably attach the shaft member 312 to the base member 314.

The shaft member 312 includes two keyways 328. The keyways 328 are adapted to engage with a holding portion of a tracked vehicle (not shown) to movably and releasably hold the track guide assembly 310. The shaft member 312 has an opening 330 extending therethrough.

The base member 314 has a planar surface 334 to abut the flange portion 318. The planar surface 334 includes threaded holes 336 to accept the bolts 326. The base member 314 also includes a locating projection 340. The locating projection 340 is adapted to be inserted into the opening 330 of the shaft member 312 to locate the shaft member 312 relative to the base member 314.

The base member 314 includes apertures 342. The apertures 342 are adapted to receive an axle of one or more track rollers (not shown).

The base member includes a support portion 315, and an attachment portion 317. The support portion 315 is attached to the attachment portion 317

Figure 26:
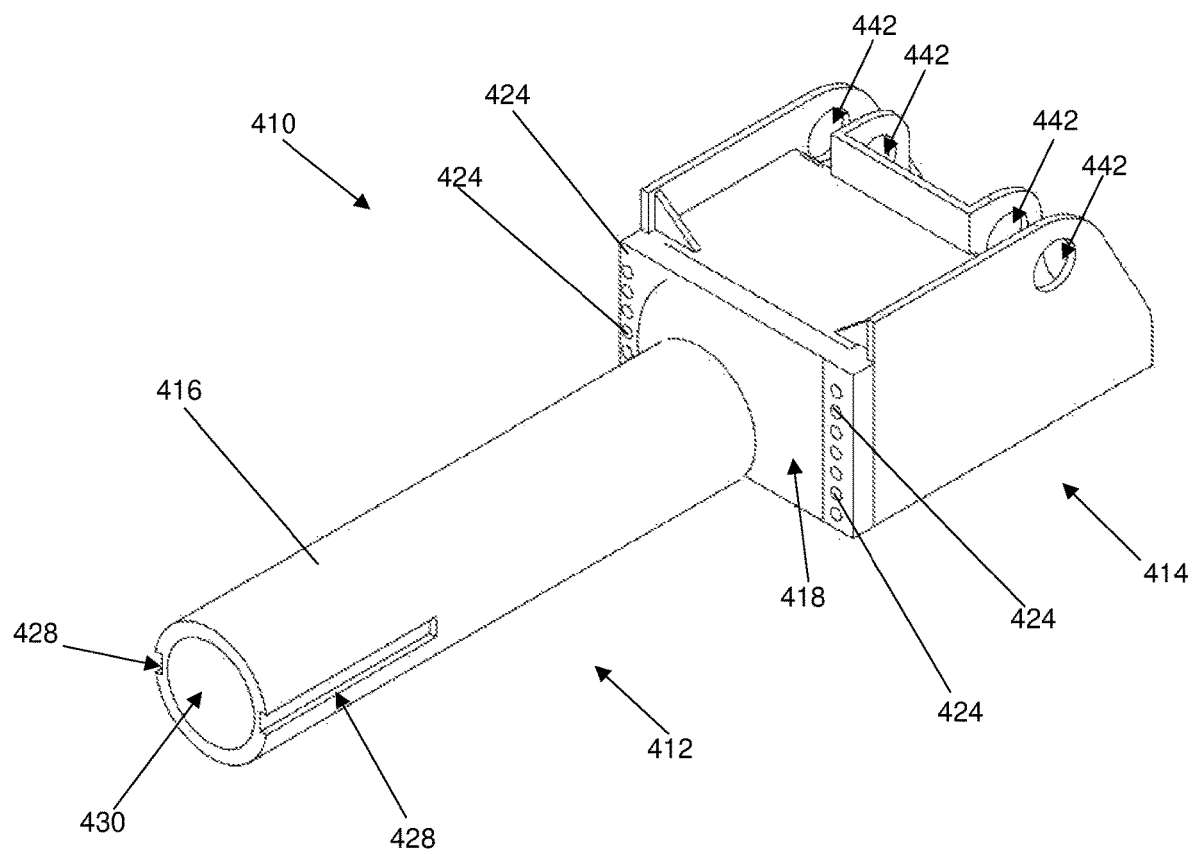
FIG. 26 is a perspective view of a track guide assembly according to another embodiment of the present invention.
Figure 27:
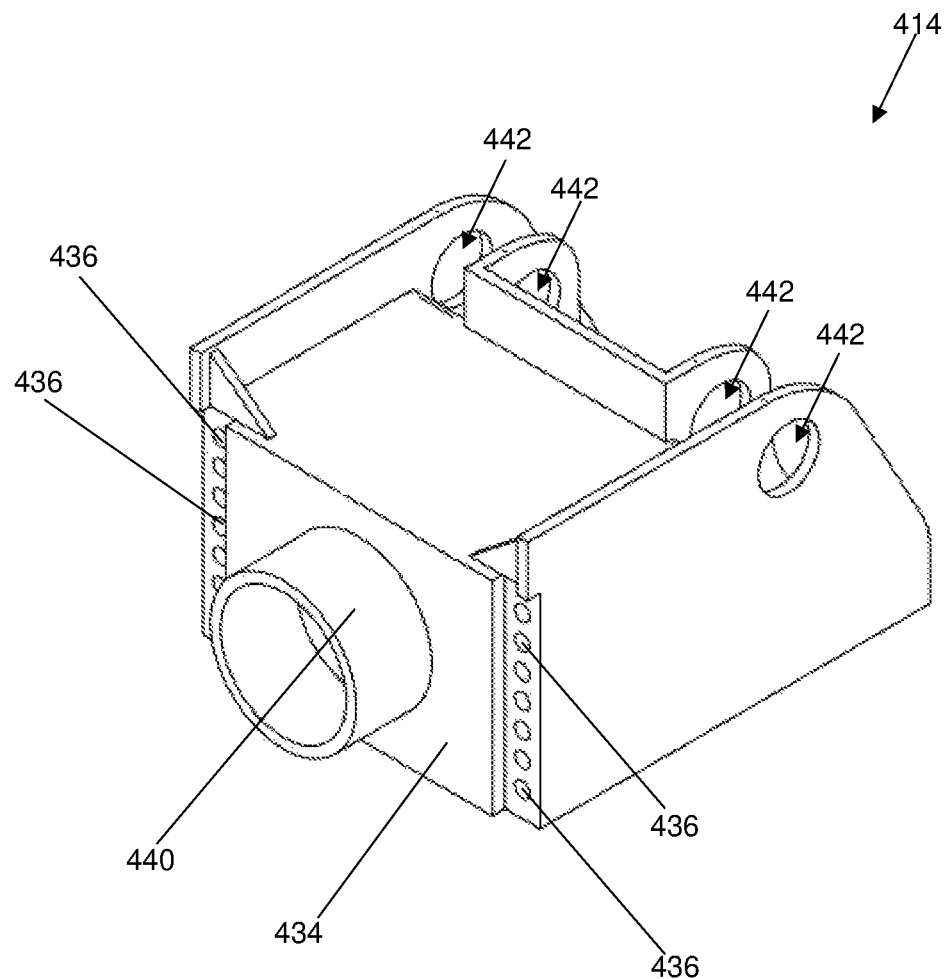
FIG. 27 is a perspective view of the base member of FIG. 26.

With reference to FIGS. 26 and 27, there is shown a track guide assembly 410 according to an embodiment of the present invention. The track guide assembly 410 has a shaft member 412 releasably attached to a base member 414.

The shaft member 412 has an elongate body portion 416. A flange portion 418 extends from the body portion 416. The flange portion 418 is substantially rectangular in cross section. The flange portion 418 includes a plurality of apertures 424. The apertures 424 are adapted to receive fasteners in the form of bolts (not shown) to releasably attach the shaft member 412 to the base member 414.

The shaft member 412 includes two keyways 428. The keyways 428 are adapted to engage with a holding portion of a tracked vehicle (not shown) to movably and releasably hold the track guide assembly 410. The shaft member 412 has an opening 430 extending therethrough.

The base member 414 has a planar surface 434 to abut the flange portion 418. The base member 414 includes threaded holes 436 to accept the bolts (not shown). The base member 414 also includes a locating projection 440. The locating projection 440 is adapted to be inserted into the opening 430 of the shaft member 412 to locate the shaft member 412 relative to the base member 414.

The base member 414 includes apertures 442. The apertures 442 are adapted to receive an axle of one or more track rollers (not shown).

Figure 28:
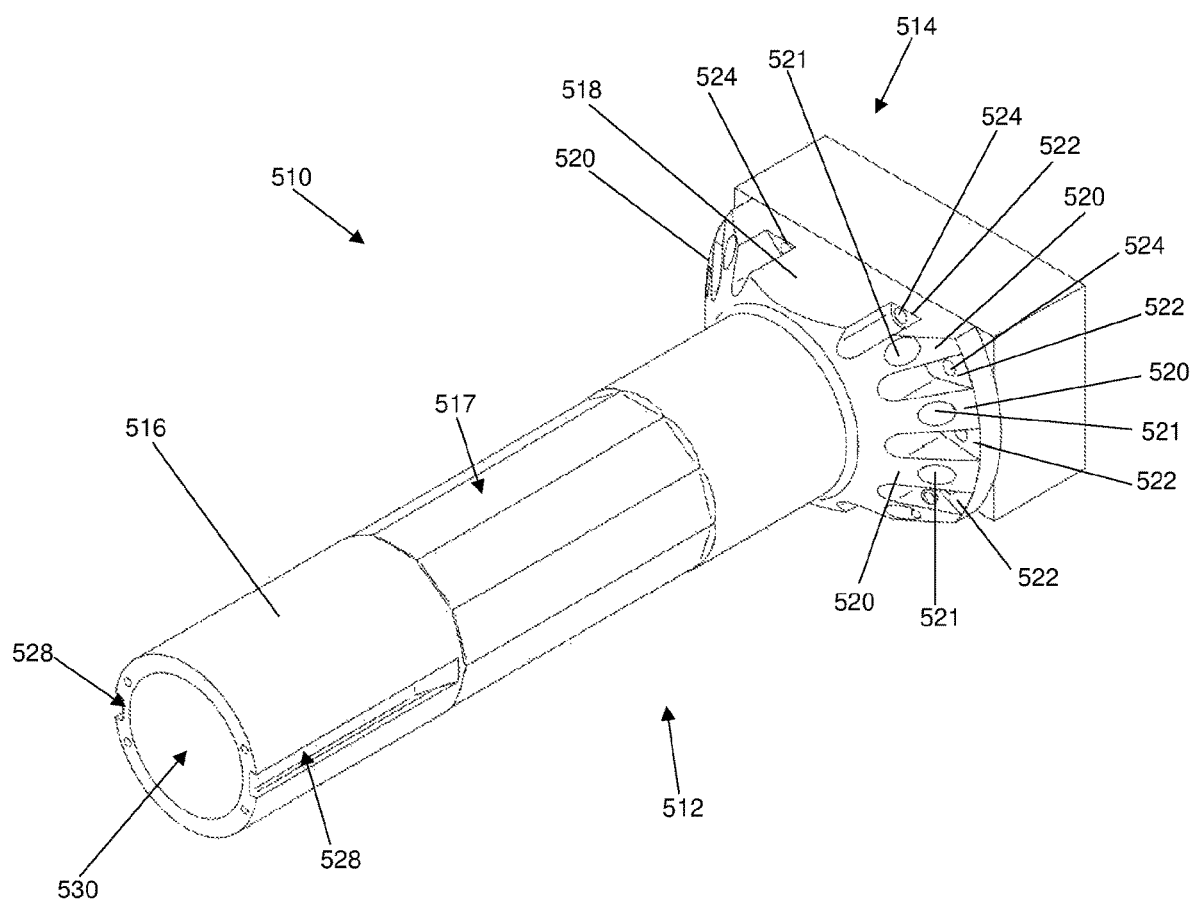
FIG. 28 is a perspective view of a track guide assembly according to a further embodiment of the present invention.

With reference to FIG. 28, there is shown a track guide assembly 510 according to an embodiment of the present invention. The track guide assembly 510 has a shaft member 512 releasably attached to a base member 514.

The shaft member 512 has an elongate body portion 516. A flange portion 518 extends from the body portion 516. The flange portion 518 has a plurality of rib portions 520 spaced from each other. The rib portions 520 include apertures 521. The apertures 521 are adapted to receive fasteners in the form of bolts (not shown) to releasably attach the shaft member 512 to the base member 514.

The flange portion 518 includes a plurality of shoulder portions 522. The shoulder portions 522 include apertures 524. The apertures 524 are adapted to receive fasteners in the form of bolts (not shown) to releasably attach the shaft member 512 to the base member 514.

The shaft member 512 includes two keyways 528. The keyways 528 are adapted to engage with a holding portion of a tracked vehicle (not shown) to movably and releasably hold the track guide assembly 510. The shaft member 512 has an opening 530 extending therethrough.

The elongate body portion 516 includes a faceted section 517. The faceted section 517 increases the torsional stability of the elongate body portion 516.

Advantages

An advantage of the preferred embodiment of the track guide assembly includes being able to replace just the shaft member instead of the whole assembly. Another advantage of the preferred embodiment of the track guide assembly includes a non welded connection between the base and the shaft member. A further advantage of the preferred embodiment of the track guide assembly includes a faster replacement compared to existing single piece assemblies. Another advantage of the preferred embodiment of the track guide assembly includes a safer and cheaper way to replace the shaft member.

Variations

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A track guide assembly having
a base member adapted to support a track roller; and
a shaft member releasably attached or attachable to the base member, the shaft member including a flange portion,
wherein the flange portion includes a plurality of rib portions,
wherein the shaft member includes an elongate body portion, and
wherein the body portion includes one or more keyways adapted to engage with a holding portion of a tracked vehicle to movably and releasably hold the track guide assembly.

2. The track guide assembly as claimed in claim 1, wherein the flange portion includes a plurality of apertures, and wherein a fastener is insertable into each aperture to releasably attach the shaft member to the base member.

3. The track guide assembly as claimed in claim 2, wherein the flange portion further includes a plurality of shoulder portions.

4. The track guide assembly as claimed in claim 3, wherein each of the plurality of rib portions has a greater thickness than each of the plurality of shoulder portions.

5. The track guide assembly as claimed in claim 3, wherein each of the plurality of rib portions are spaced from an adjacent rib member by one of the plurality of shoulder portions.

6. The track guide assembly as claimed in claim 3, wherein each of the plurality of shoulder portions include one of the plurality of apertures.

7. The track guide assembly as claimed in claim 2, wherein each of the plurality of rib portions include one of the plurality of apertures.

8. The track guide assembly as claimed in claim 1, wherein the flange portion extends laterally from the body portion, and wherein an opening extends substantially longitudinally through the body portion.

9. The track guide assembly as claimed in claim 1, wherein the track guide assembly is made of metal.

10. The track guide assembly as claimed in claim 9, wherein the track guide assembly is machined from cast metal.

11. The track guide assembly as claimed in claim 9, wherein the metal is steel.

12. A tracked vehicle including one or more track guide assemblies as claimed in claim 1.

13. The tracked vehicle as claimed in claim 12, wherein the tracked vehicle is an earth moving vehicle.

14. A method of replacing the shaft member of the track guide assembly as claimed in claim 1, including the steps of
detaching the shaft member from the base member; and
releasably attaching a new shaft member to the base member.

15. The method as claimed in claim 14, wherein the step of detaching the shaft member from the base member includes disengaging one or more fasteners between the shaft member and the base member.

16. The method as claimed in claim 15, wherein the one or more fasteners are bolts.

17. The method as claimed in claim 14, wherein the step of releasably attaching the new shaft member to the base member includes attaching the new shaft member using one or more fasteners.

18. A track guide assembly for a tracked vehicle, the track guide assembly having
a base member adapted to support a track roller; and
a shaft member releasably attached or attachable to the base member, the shaft member including a flange portion,
wherein the flange portion includes a plurality of rib portions and is adapted to be attached to the base member by a plurality of fasteners;
wherein the shaft member includes an elongate body portion; and
wherein the body portion includes one or more keyways adapted to engage with a holding portion of a tracked vehicle to movably and releasably hold the track guide assembly.

19. A track guide assembly having
a base member operatively attachable to one or more track rollers; and
a shaft member releasably attached or attachable to the base member, the shaft member including an elongate body portion and a flange portion,
wherein the flange portion includes a plurality of rib portions and a plurality of shoulder portions, each of the plurality of rib portions spaced from an adjacent rib member by one of the plurality of shoulder portions, each of the plurality of rib portions having a greater thickness than each of the plurality of shoulder portions, and wherein each of the plurality of shoulder portions has an aperture through which a fastener is insertable to releasably attach the shaft member to the to the base member, and
wherein the body portion includes one or more keyways adapted to engage with a holding portion of a tracked vehicle to movably and releasably hold the track guide assembly.

20. A track guide assembly having
a base member operatively attachable to a track roller; and
a shaft member releasably attached or attachable to the base member, the shaft member including a flange portion,
wherein the flange portion includes a plurality of rib portions and is adapted to be attached to the base member by a plurality of fasteners,
wherein the shaft member includes an elongate body portion, and
wherein the body portion includes one or more keyways adapted to engage with a holding portion of a tracked vehicle to movably and releasably hold the track guide assembly.

* * * * *

UNITED STATES PATENT AND TRADEMARK OFFICE
CERTIFICATE OF CORRECTION

PATENT NO. : 12,491,955 B2  
APPLICATION NO. : 18/024784  
DATED : December 9, 2025  
INVENTOR(S) : Mohan Raju Narayan Page 1 of 1

It is certified that error appears in the above-identified patent and that said Letters Patent is hereby corrected as shown below:

In the Claims

Column 10, Lines 23-24, Claim 19, delete "to the to the" and insert -- to the --

Signed and Sealed this  
Tenth Day of February, 2026

John A. Squires  
*Director of the United States Patent and Trademark Office*